(12) United States Patent
Liao et al.

(10) Patent No.: US 10,509,250 B2
(45) Date of Patent: Dec. 17, 2019

(54) CHOLESTERIC LIQUID CRYSTAL WRITING BOARD

(71) Applicant: IRIS OPTRONICS CO., LTD., Tainan (TW)

(72) Inventors: Chi-Chang Liao, Tainan (TW);
Shu-Shien Liu, Tainan (TW);
Tsung-Ming Pai, Tainan (TW);
Fu-Ming Wang, Tainan (TW)

(73) Assignee: IRIS OPTRONICS CO., LTD., Tainan (TW)

( * ) Notice: Subject to any disclaimer, the term of this patent is extended or adjusted under 35 U.S.C. 154(b) by 0 days.

(21) Appl. No.: 16/004,772

(22) Filed: Jun. 11, 2018

(65) Prior Publication Data
US 2019/0324308 A1    Oct. 24, 2019

(30) Foreign Application Priority Data

Apr. 19, 2018 (TW) .............................. 107113411 A

(51) Int. Cl.
| | |
|---|---|
| *G02F 1/1333* | (2006.01) |
| *G02F 1/133* | (2006.01) |
| *G02F 1/1362* | (2006.01) |
| *G02F 1/1368* | (2006.01) |
| *G02F 1/1343* | (2006.01) |
| *G06F 3/042* | (2006.01) |
| *G06F 3/041* | (2006.01) |

(Continued)

(52) U.S. Cl.
CPC ........ *G02F 1/13338* (2013.01); *G02F 1/1368* (2013.01); *G02F 1/13318* (2013.01); *G02F 1/13439* (2013.01); *G02F 1/134336* (2013.01); *G02F 1/136286* (2013.01); *G06F 3/042* (2013.01); *G06F 3/0416* (2013.01); *G02F 1/1337* (2013.01); *G02F 1/133512* (2013.01); *G02F 2203/64* (2013.01)

(58) Field of Classification Search
CPC ............... G09G 3/3648; G09G 3/3208; G09G 2300/023; G02F 1/1362
See application file for complete search history.

(56) References Cited

U.S. PATENT DOCUMENTS

| | | | |
|---|---|---|---|
| 2007/0032000 A1* | 2/2007 | Yeh .................... | G02F 1/133555 438/149 |
| 2008/0259015 A1* | 10/2008 | Nose ........................ | G09G 3/36 345/89 |
| 2016/0232856 A1* | 8/2016 | Hidaka ..................... | G09G 3/20 |

* cited by examiner

*Primary Examiner* — Shaheda A Abdin
(74) *Attorney, Agent, or Firm* — Muncy, Geissler, Olds & Lowe, P.C.

(57) ABSTRACT

A cholesteric liquid crystal writing board comprises a cholesteric liquid crystal device, a photo-sensing array layer and a mode control unit. The photo-sensing array layer is disposed at one side of the light-emitting surface of the cholesteric liquid crystal device. The photo-sensing array layer comprises a plurality of gate control lines and a plurality of mode control lines. The mode control unit comprises a main control circuitry and a plurality of mode switches coupled to the main control circuitry. Each mode switch is coupled to one of the mode control lines correspondingly. The gate control lines intersect with the mode control lines so as to define a plurality of light sensing areas arranged in an array. Each light sensing area has a switch element and a light-sensing element. The main control circuitry controls each mode switch to be switched between a voltage output mode and a voltage write mode.

21 Claims, 13 Drawing Sheets

(51) Int. Cl.
*G02F 1/1337* (2006.01)
*G02F 1/1335* (2006.01)

CHOLESTERIC LIQUID CRYSTAL WRITING BOARD

CROSS REFERENCE TO RELATED APPLICATIONS

This Non-provisional application claims priority under 35 U.S.C. § 119(a) on Patent Application No(s). 107113411 filed in Taiwan, Republic of China on Apr. 19, 2018, the entire contents of which are hereby incorporated by reference.

BACKGROUND

Technology Field

The disclosure relates to a cholesteric liquid crystal writing board, and more particularly to a cholesteric liquid crystal writing board that can be used in the interactive writing system for interactive teaching or interactive conference.

Description of Related Art

In cholesteric liquid crystals, chiral dopants are added to nematic liquid crystals to make the liquid crystal molecules to have a helical arrangement structure, and two different arrangement states of liquid crystal molecules rendering reflection and penetration under various voltage differences are utilized to achieve different light transmission rates to achieve the display effect. The principle is that, when a low voltage or a high voltage is externally applied, the liquid crystal molecules may be transformed into a focal conic state and a homeotropic state from the planar state, respectively. When the cholesteric liquid crystal molecules are in the planar state, part of the incident light is reflected to show a color. When the cholesteric liquid crystal molecules are in the focal conic state, most of the incident light pass through those molecules and a small portion thereof is scattered. When the cholesteric liquid crystal molecules are in the vertical state, the incident light may pass through those molecules completely.

The planar state and the focal conic state are both stable states. When the applied voltage is turned off, the state of the molecules and the displayed images stay. The voltage is only applied when the state of the cholesteric liquid crystal molecules need to be changed to another state and when the displayed images need to be refreshed. Its properties, such as power-saving and the memorability, also make the cholesteric liquid crystals become the first choice for e-books. In addition, this display mechanism is less affected by the gap between the upper and lower plates, and potentially can be applied in a bistable flexible display. Compared with other types (e.g. TN-type) of liquid crystal displays, the cholesteric liquid crystal display has the advantages of power-saving, colorful display, light-adjusting, and the ability to be applied in a bistable flexible display, which contribute to its wide application.

SUMMARY

An objective of this disclosure is to provide a cholesteric liquid crystal writing board that can be used in the interactive writing system for interactive teaching or interactive conference. The cholesteric liquid crystal writing board of the present disclosure utilizes the properties of the cholesteric liquid crystals, so that it can achieve power-saving, perform a function of erasing a partial portion, and have interactive action with other electronic devices, thereby expanding the application of the cholesteric liquid crystal writing board and achieving the purposes of lower cost and instant interactive action.

The present disclosure provides a cholesteric liquid crystal writing board, comprising a cholesteric liquid crystal device, a photo-sensing array layer and a mode control unit. The cholesteric liquid crystal device comprises a cholesteric liquid crystal layer, and the cholesteric liquid crystal device has a light-entering surface and a light-emitting surface disposed corresponding to the light-entering surface. The photo-sensing array layer is disposed at one side of the light-emitting surface of the cholesteric liquid crystal device. The photo-sensing array layer comprises a plurality of gate control lines and a plurality of mode control lines, and the gate control lines and the mode control lines are intersected to define a plurality of light-sensing areas arranged in an array. Each of the light-sensing areas is configured with a switch element and a light-sensing element. The mode control unit comprises a main control circuitry and a plurality of mode switches coupled to the main control circuitry. Each of the mode switches is coupled to one of the mode control lines correspondingly, and the main control circuitry controls each of the mode switches to be switched between a voltage output mode and a voltage write mode.

In one embodiment, the cholesteric liquid crystal writing board further comprises a sensing signal processing unit coupled to the photo-sensing array layer through the mode switches. When each of the mode switches is in the voltage output mode, at least one of the light-sensing elements of the photo-sensing array layer senses a luminous flux change so as to generate a sensing signal, and the sensing signal processing unit receives the sensing signal and generates position data of the light-sensing element, which generates the sensing signal, in the photo-sensing array layer accordingly.

In one embodiment, the sensing signal processing unit generates an erasing signal according to the position data and transmits the erasing signal to the main control circuitry of the mode control unit. After receiving the erasing signal, the main control circuitry outputs a mode control signal accordingly to one or more of the mode switches corresponding to the position data so as to switch the one or more of the mode switches to the voltage write mode.

In one embodiment, the cholesteric liquid crystal device further comprises a plurality of liquid crystal control areas, and the main control circuitry further outputs a voltage signal according to the erasing signal and transmits the voltage signal to the liquid crystal control area corresponding to the position data through the one or more of the mode switches for partially or entirely morphologically changing cholesteric liquid crystals corresponding to the liquid crystal control areas.

In one embodiment, the light-sensing area corresponds to at least one or more of the liquid crystal control areas.

In one embodiment, the sensing signal processing unit further outputs a display control signal according to the position data, and the cholesteric liquid crystal writing board further comprises a communication unit coupled to the sensing signal processing unit. The communication unit receives the display control signal and transmits the display control signal to an electronic device.

In one embodiment, the display control signal is transmitted to the electronic device when the gate control lines are conducted.

In one embodiment, the display control signal is transmitted to the electronic device during a blanking time after the gate control lines are conducted.

In one embodiment, the display control signal comprises a signal for controlling the electronic device to display a writing track.

In one embodiment, the display control signal comprises a signal for controlling the electronic device to erase a writing track.

In one embodiment, the luminous flux change is generated after at least partial of the cholesteric liquid crystal layer has a morphologically change caused by a pressing action.

In one embodiment, the luminous flux change is generated after the light-entering surface of the cholesteric liquid crystal device is irradiated by a light.

In one embodiment, the mode switch is switched to the voltage output mode within a frame time, and is switched to the voltage write mode within another frame time.

In one embodiment, a control end of the switch element connects to one of the gate control lines, a first end of the switch element connects to one of the mode control lines, a second end of the switch element connects to one end of the light-sensing element, and the other end of the light-sensing element connects to a reference voltage.

In one embodiment, the cholesteric liquid crystal device further comprises a first substrate and a second substrate opposite to the first substrate, and the cholesteric liquid crystal layer is disposed between the first substrate and the second substrate. The cholesteric liquid crystal device further comprises a first transparent electroconductive layer disposed on a surface of the first substrate facing toward the cholesteric liquid crystal layer, and the cholesteric liquid crystal device further comprises a second transparent electroconductive layer disposed on one side of the second substrate facing toward the cholesteric liquid crystal layer.

In one embodiment, the first transparent electroconductive layer comprises a plurality of first electrodes extending in a first direction and separately disposed, the second transparent electroconductive layer comprises a plurality of second electrodes extending in a second direction and separately disposed, and the first direction is different from the second direction.

In one embodiment, the cholesteric liquid crystal device further comprises a plurality of liquid crystal control areas, and when viewing from a top of the light-entering surface, the first electrodes are crossed with the second electrodes and their intersections are disposed in correspondence to the liquid crystal control areas.

In one embodiment, the cholesteric liquid crystal device further comprises a plurality of liquid crystal control areas, the second transparent electroconductive layer comprises a plurality of electrode blocks, and the electrode blocks are disposed in correspondence with the liquid crystal control areas.

In one embodiment, the cholesteric liquid crystal device further comprises a plurality of liquid crystal control areas, the first transparent electroconductive layer and the second transparent electroconductive layer comprise a plurality of electrode blocks, and the electrode blocks are disposed in correspondence with the liquid crystal control areas.

In one embodiment, the cholesteric liquid crystal device further comprises an insulating layer, and the second transparent electroconductive layer, the insulating layer and the photo-sensing array layer are sequentially stacked on a surface of the second substrate facing toward the cholesteric liquid crystal layer.

In one embodiment, the photo-sensing array layer is disposed on a surface of the second substrate away from the cholesteric liquid crystal layer.

In one embodiment, the photo-sensing array layer is disposed on a side of the second substrate away from the cholesteric liquid crystal layer, the photo-sensing array layer comprises a third substrate, and the light-sensing elements arranged in an array are disposed on a surface of the third substrate facing toward the second substrate.

As mentioned above, in the cholesteric liquid crystal writing board of this disclosure, the cholesteric liquid crystal device comprises a cholesteric liquid crystal layer, and the photo-sensing array layer is disposed at one side of the light-emitting surface of the cholesteric liquid crystal device; the photo-sensing array layer comprises a plurality of gate control lines and a plurality of mode control lines, the gate control lines and the mode control lines are intersected to define a plurality of light-sensing areas arranged in an array, and each of the light-sensing areas is configured with a switch element and a light-sensing element; and the mode control unit comprises a main control circuitry and a plurality of mode switches coupled to the main control circuitry, each of the mode switches is coupled to one of the mode control lines correspondingly, and the main control circuitry controls each of the mode switches to be switched between a voltage output mode and a voltage write mode. The cholesteric liquid crystal writing board of the present disclosure utilizes the properties of the cholesteric liquid crystals, so that it can achieve power-saving, and obtain the position information of the cholesteric liquid crystal writing board having luminous flux change in the voltage output mode. Accordingly, the cholesteric liquid crystal writing board can perform a corresponding control action, such as to perform a partial erasing action and/or to have interactive action with another electronic device. This feature can expand the application of the cholesteric liquid crystal writing board (e.g., in the interactive writing system for interactive teaching or interactive conference) and achieve the purposes of lower cost and instant interactive action.

BRIEF DESCRIPTION OF THE DRAWINGS

The disclosure will become more fully understood from the detailed description and accompanying drawings, which are given for illustration only, and thus are not limitative of the present disclosure, and wherein.

DETAILED DESCRIPTION OF THE DISCLOSURE

The present disclosure will be apparent from the following detailed description, which proceeds with reference to the accompanying drawings, wherein the same references relate to the same elements.

It is to be noted that all directional indications (such as up, down, left, right, front, rear and the like) in the embodiments of the present disclosure are only used for explaining the relative positional relationship, circumstances during its operation, and the like, between the various components in a certain specific posture (as shown in the accompanying drawings). If the specific posture changes, the directional indication will also change accordingly.

The cholesteric liquid crystal writing boards provided in the embodiments of the present disclosure utilize the properties of cholesteric liquid crystal molecules and are therefore bistable display apparatuses. When the cholesteric liquid crystal writing board displays an image or a frame, no additional power is required, and this image or frame stays as is. Additional power is only required when the cholesteric crystal molecules needs to be changed to another state or the displayed frame(s) needs to be refreshed. Hence, the cholesteric liquid crystal writing board is a relatively power-saving electronic device.

The cholesteric liquid crystal writing board provided in the embodiments of the present disclosure can be written or drawn to show texts and/or images on the writing surface thereof. Alternatively, the texts or images shown on the cholesteric liquid crystal writing board can be partially erased, and other electronic devices can also be performed with the same erase action through network connection, thereby generating the interactive action with other electronic devices. This feature can expand the application of the cholesteric liquid crystal writing board and achieve the purposes of lower cost and instant interactive action.

The cholesteric liquid crystal writing board of the present disclosure can be applied to, for example but without limiting to, mobile phones, tablets, electronic whiteboards, or any other display devices that can display images. The cholesteric liquid crystal writing boards in the following embodiments are exemplified by large-sized electronic blackboards (or whiteboards) applied to an interactive writing system, such as those used in a conference or a classroom, but the present disclosure is not limited thereto.

Figure 1:
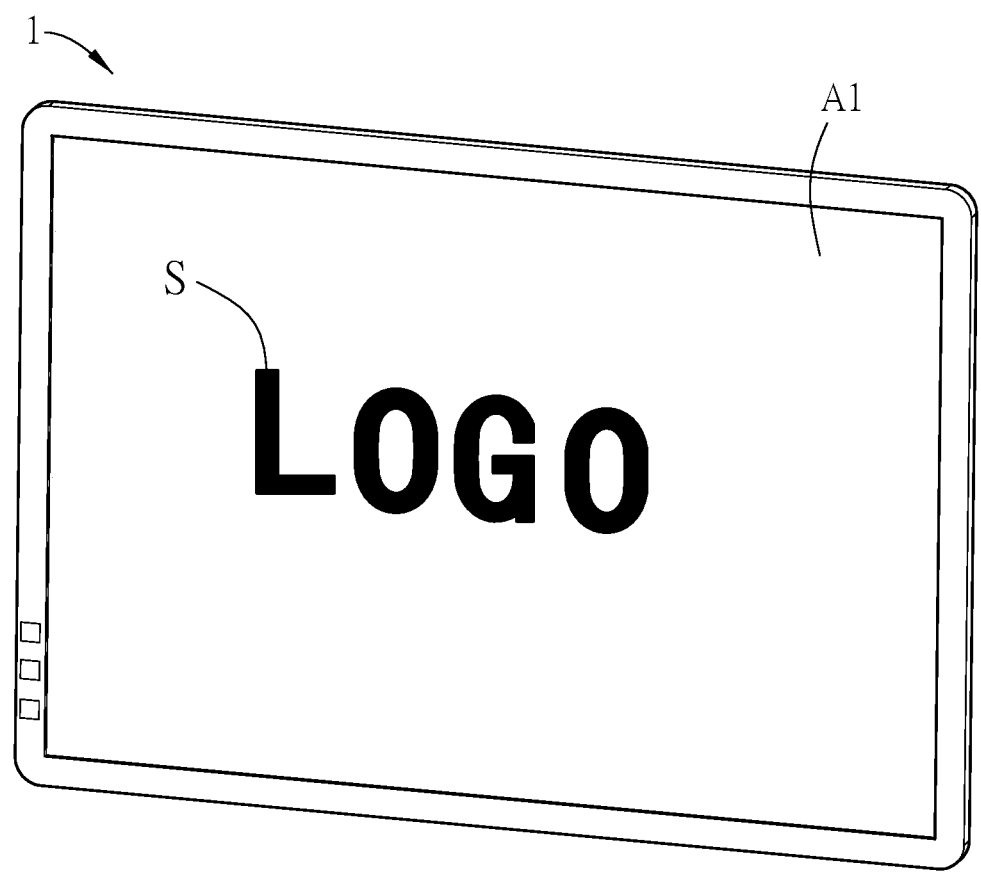
FIG. 1 is a schematic application view showing an embodiment of the cholesteric liquid crystal writing board of this disclosure.
Figure 2A:
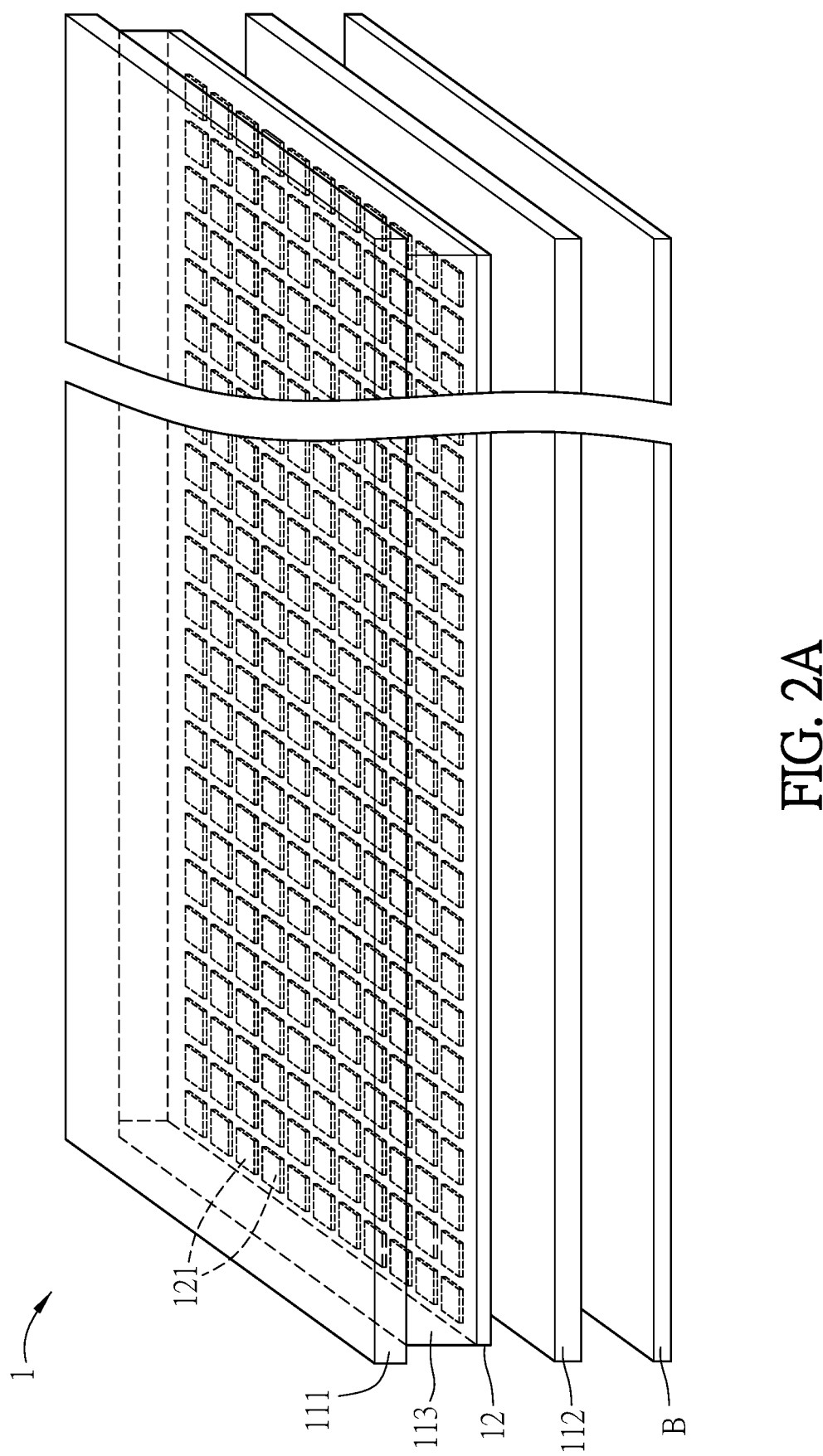
FIG. 2A is a partially-exploding stereoscopic schematic view showing an embodiment of the cholesteric liquid crystal writing board of this disclosure.
Figure 2B:
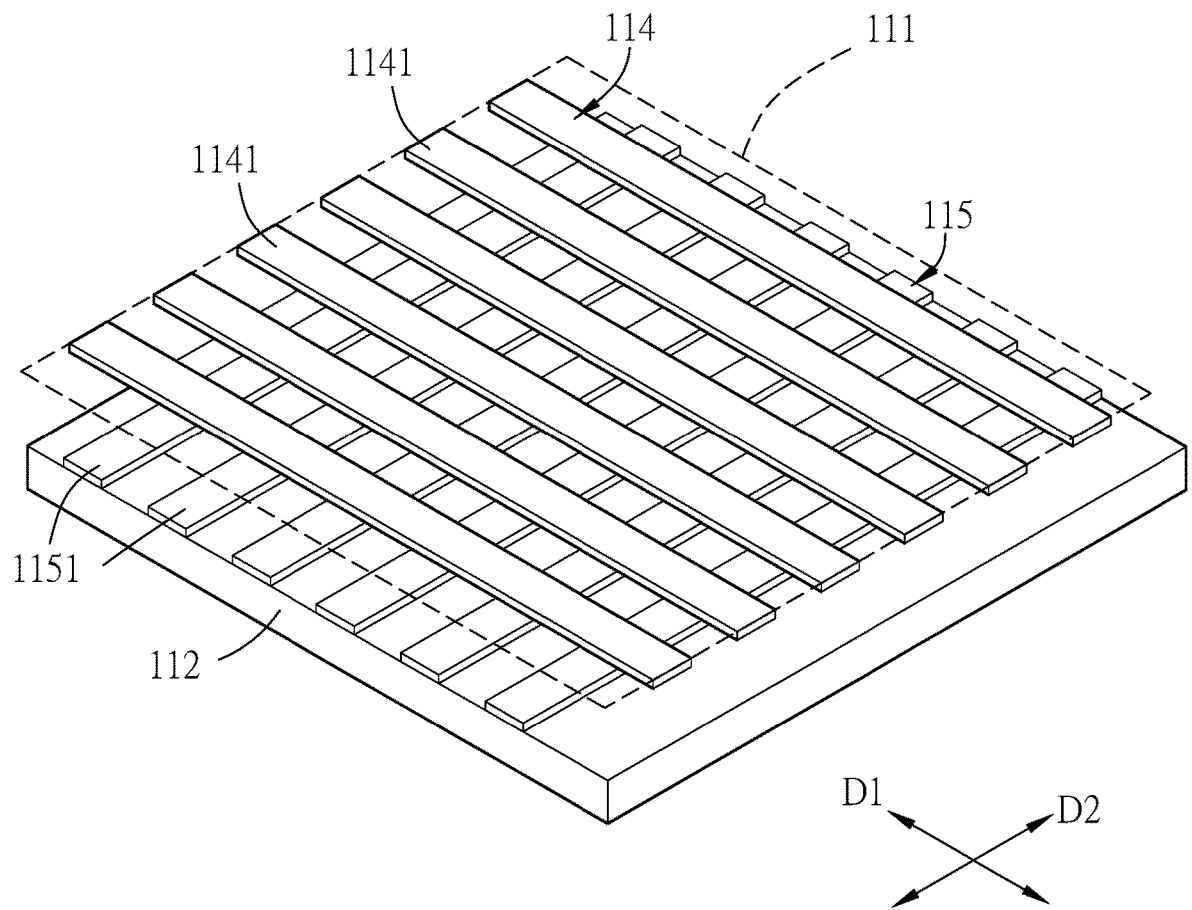
FIG. 2B is a partially stereoscopic view showing an embodiment of the cholesteric liquid crystal writing board of this disclosure.
Figure 2C:
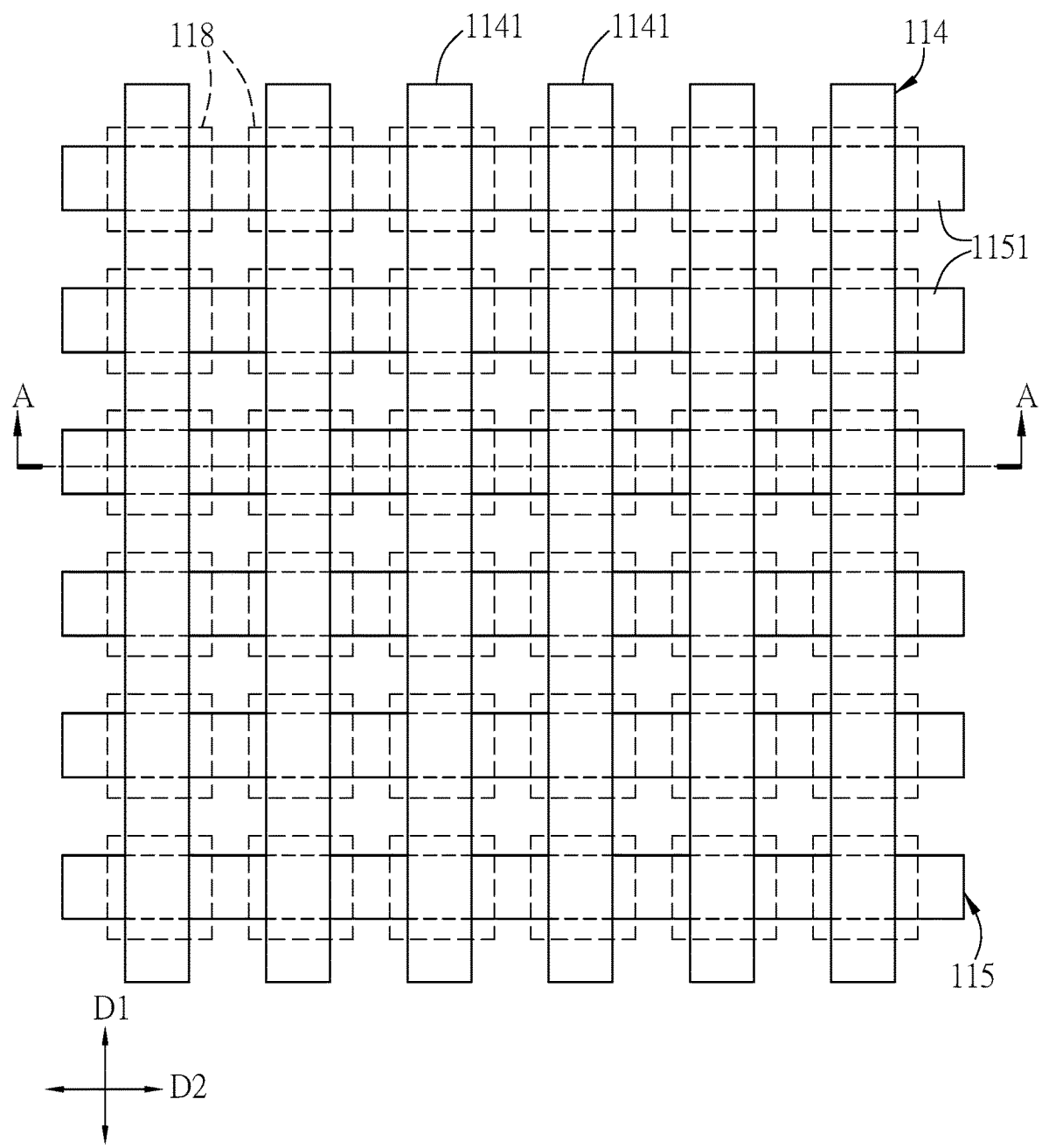
FIG. 2C is a schematic top view showing a first transparent electroconductive layer and a second transparent electroconductive layer of the cholesteric liquid crystal writing board of FIG. 2B.
Figure 2D:
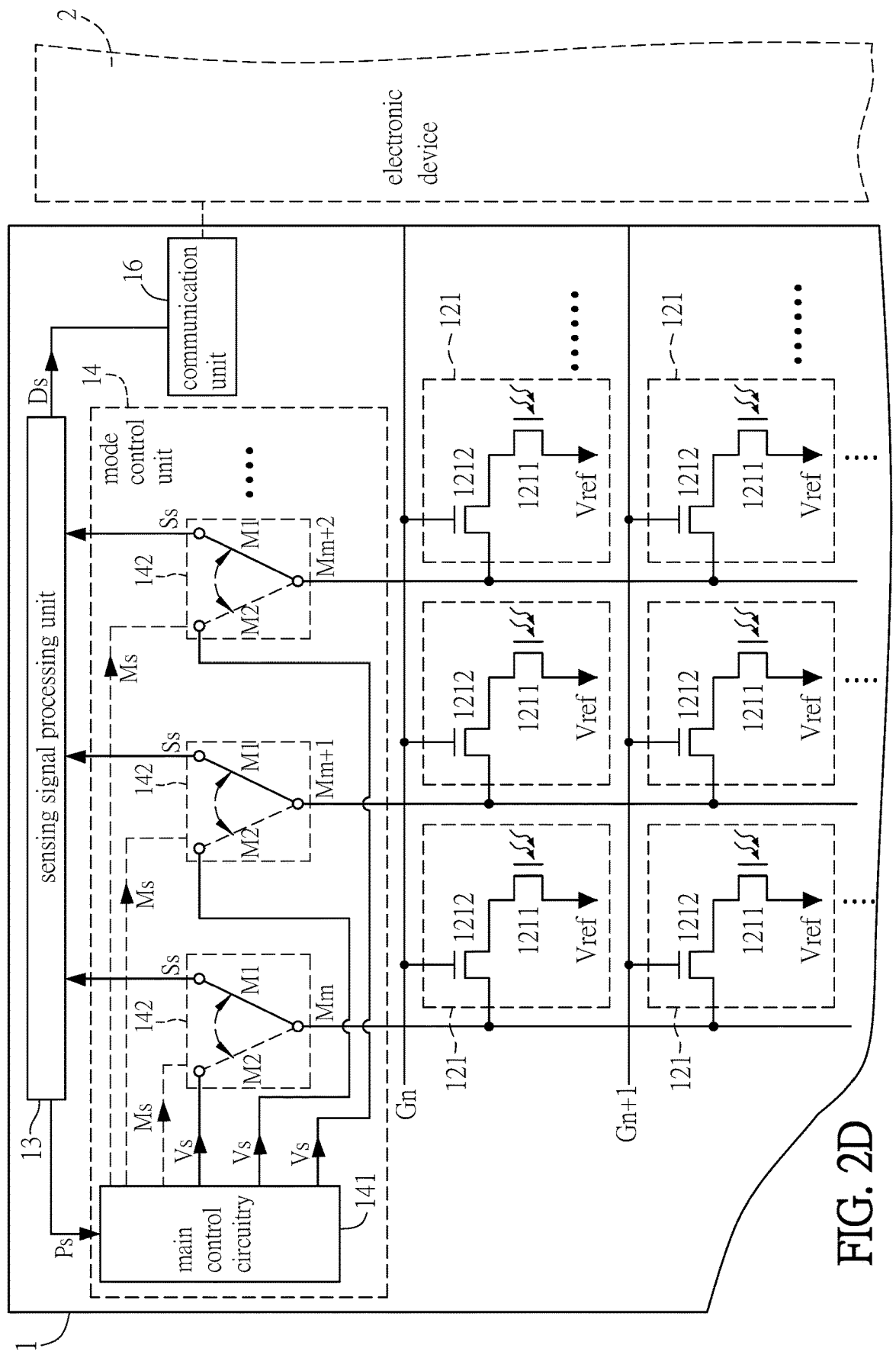
FIG. 2D is a schematic view showing the cholesteric liquid crystal writing board of FIG. 1.
Figure 2E:
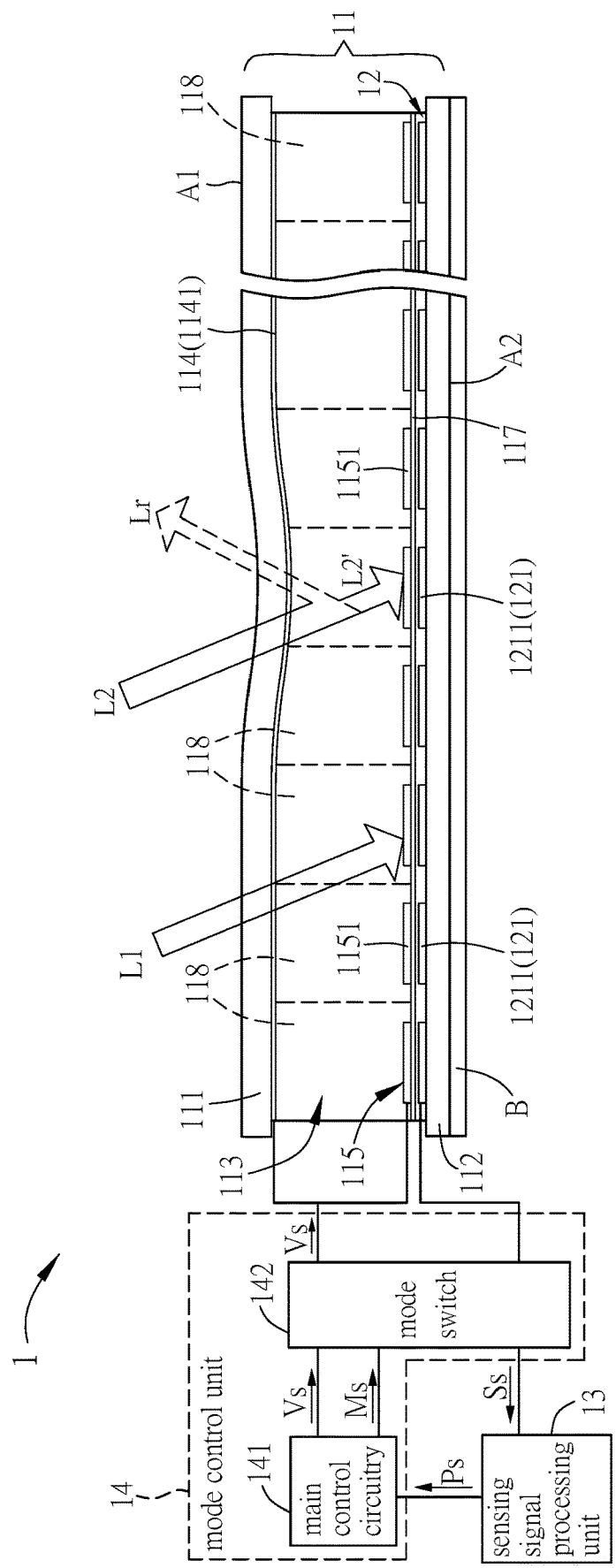
FIG. 2E is a schematic partial view showing the cholesteric liquid crystal writing board of FIG. 1, which is pressed.

FIG. 1 is a schematic application view showing an embodiment of the cholesteric liquid crystal writing board of this disclosure. FIG. 2A is a partially-exploding stereoscopic schematic view showing an embodiment of the cholesteric liquid crystal writing board of this disclosure. FIG. 2B is a partially stereoscopic view showing an embodiment of the cholesteric liquid crystal writing board of this disclosure. FIG. 2C is a schematic top view showing a first transparent electroconductive layer and a second transparent electroconductive layer of the cholesteric liquid crystal writing board of FIG. 2B. FIG. 2D is a schematic view showing the cholesteric liquid crystal writing board of FIG. 1. FIG. 2E is a schematic partial view showing the cholesteric liquid crystal writing board of FIG. 1, which is pressed.

As shown in FIG. 1 and through FIG. 2A to FIG. 2E, a cholesteric liquid crystal writing board 1 is configured to communicational connect with an electronic device 2. The cholesteric liquid crystal writing board 1 comprises a cholesteric liquid crystal device 11, a photo-sensing array layer 12, and a mode control unit 14. In addition, the cholesteric liquid crystal writing board 1 further comprises a sensing signal processing unit 13 and a communication unit 16. The sensing signal processing unit 13, the communication unit 16 and the electronic device 2 can be referred to FIG. 2D.

The cholesteric liquid crystal device 11 has a light-entering surface A1 and a light-emitting surface A2 opposite to the light-entering surface A1, and the cholesteric liquid crystal device 11 comprises a plurality of liquid crystal control areas 118 (as shown in FIG. 2C and FIG. 2E). The light-entering surface A1 of this embodiment is a surface of the cholesteric liquid crystal writing board 1 facing toward the user, and is also referred to a writing surface or a display surface. The user can write (press) thereon to generate a writing track S. In some embodiments, a protective film layer or protective substrate may be further provided on the light-entering surface A1 to protect the cholesteric liquid crystal writing board 1.

The cholesteric liquid crystal device 11 may display a color correspondingly. In details, the cholesteric liquid crystal device 11 may be prepared to show colors, such as red (R), green (G), or blue (B) and the like, by adding various chiral dopants with different contents. Herein, the color correspondingly displayed by the cholesteric liquid crystal device 11 may be selected from, for example but without limiting to, either red, green, blue, or other color of visible light. The specific orientation of the cholesteric liquid crystal molecules is achieved by adding chiral dopants to the nematic liquid crystal molecules. The display and erasing function is achieved by using cholesteric liquid crystal molecules which may exhibit various stable states and transient states, such as at least a focal conic state, a planar state and a homeotropic state, and the like, under various voltages, physical pressures and/or temperatures. Hence, by changing the axial orientation of the helical structure of the cholesteric liquid crystal molecules, a portion of the incident light is reflected and/or a portion of the light may pass through the cholesteric liquid crystals. In other words, the display, writing, and/or erasing functions of the cholesteric liquid crystal device 11 may be achieved with the different optical reflectance or transmittance possessed by the cholesteric liquid crystal molecules at different stable states or transient states.

As shown in FIGS. 2A to 2E, the photo-sensing array layer 12 is disposed on the side of the light-emitting surface A2 of the cholesteric liquid crystal device 11. The photo-sensing array layer 12 may comprise a plurality of light-sensing areas 121 or light-sensing elements 1211 arranged in an array, and a light-sensing area 121 or light-sensing element 1211 may correspond to at least one or a plurality of liquid crystal control areas 118. As shown in FIG. 2E, in this embodiment, as an example, a light-sensing area 121 corresponds to a liquid crystal control area 118. In addition, as shown in FIG. 2D, the photo-sensing array layer 12 further comprises a plurality of gate control lines and a plurality of mode control lines, the gate control lines and the mode control lines are intersected to define the light-sensing areas 121. The mode control unit 14 comprises a main control circuitry 141 and a plurality of mode switches 142 coupled to the main control circuitry 141. Each of the mode switches 142 is coupled to one of the mode control lines correspondingly. For the sake of clarity of the drawing, FIG. 2D shows three mode switches 142, two gate control lines Gn and Gn+1, and three mode control lines Mm, Mm+1 and Mm+2. In this embodiment, the gate control lines Gn and Gn+1 are intersected with the mode control lines Mm, Mm+1 and Mm+2 so as to define six light-sensing areas 121. In this case, one light-sensing area 121 is disposed corresponding to one mode control line and one mode switch 142, and each light-sensing area 121 is configured with a switch element 1212 and a light-sensing element 1211. The main control circuitry 141 of the mode control unit 14 can control each of the mode switches 142 to be switched between a voltage output mode M1 (or voltage output position) and a voltage write mode M2 (or voltage write position) for performing the corresponding control action. The detailed description thereof will be discussed hereinafter. In addition, the sensing signal processing unit 13 is coupled to the light-sensing areas 121 of the photo-sensing array layer 12 through the mode switches 142. The mode control unit 14 is further coupled to the cholesteric liquid crystal device 11 for controlling the morphological change of the cholesteric liquid crystal molecules of the cholesteric liquid crystal device 11.

Hereinafter, the structure of the cholesteric liquid crystal device 11 will be described. In this embodiment, FIG. 2E depicts a cross-sectional view of the first transparent electroconductive layer 114 and the second transparent electroconductive layer 115 along the A-A line shown in FIG. 2C. As shown in through FIG. 2B to FIG. 2E, the cholesteric liquid crystal device 11 may comprise a first substrate 111, a second substrate 112 and a cholesteric liquid crystal layer 113. The first substrate 111 is disposed opposite to the second substrate 112, the cholesteric liquid crystal layer 113 has a plurality of cholesteric liquid crystal molecules (not shown in the drawings), and the cholesteric liquid crystal molecules may be filled between the first substrate 111 and the second substrate 112. The cholesteric liquid crystal device 11 further comprises a first transparent electroconductive layer 114 disposed on a surface of the first substrate 111 facing toward the cholesteric liquid crystal layer 113. The cholesteric liquid crystal device 11 further comprises a second transparent electroconductive layer 115 disposed on one side of the second substrate 112 facing toward the cholesteric liquid crystal layer 113.

Figure 3A:
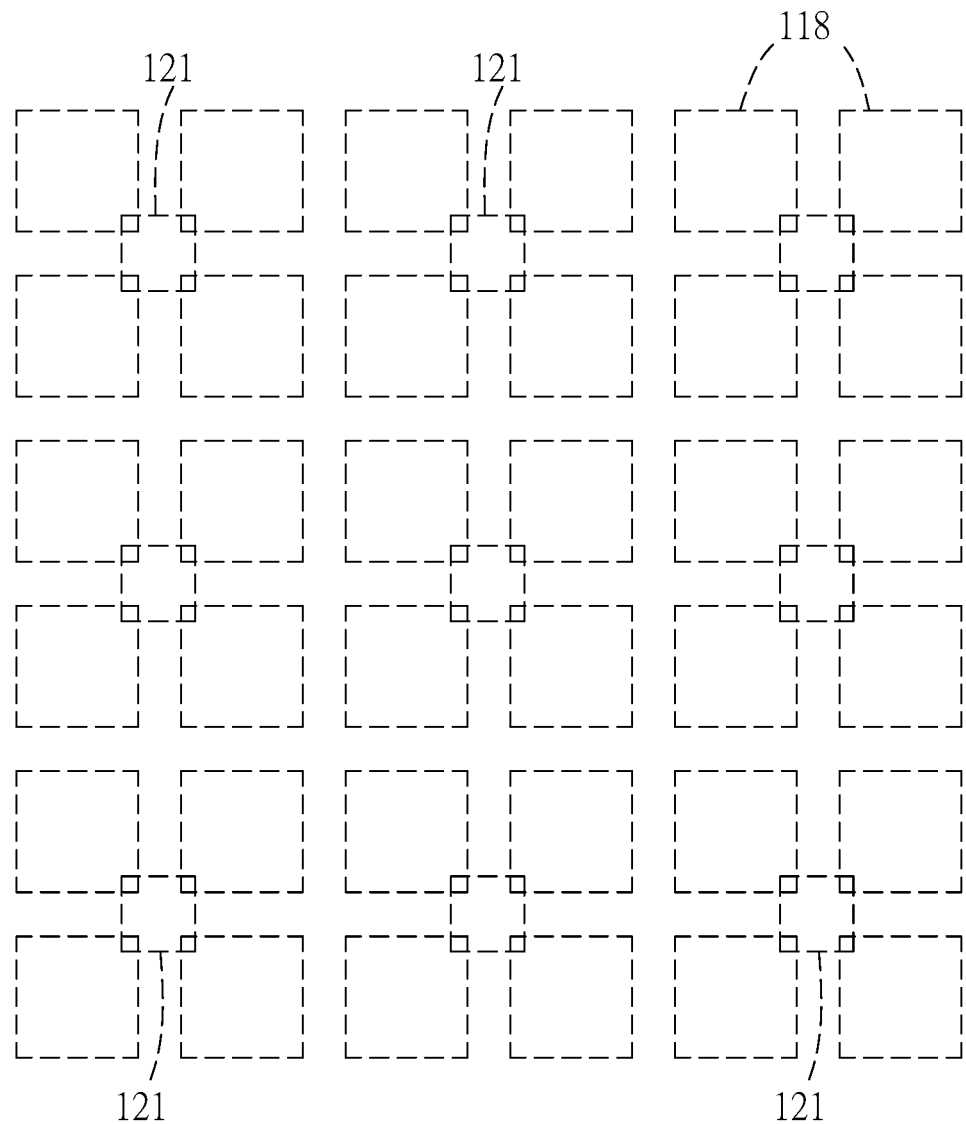
FIG. 3A is a schematic view showing an embodiment regarding to the correspondence between the liquid crystal control areas and the photo-sensing areas of the cholesteric liquid crystal writing board of this disclosure.
Figure 3B:
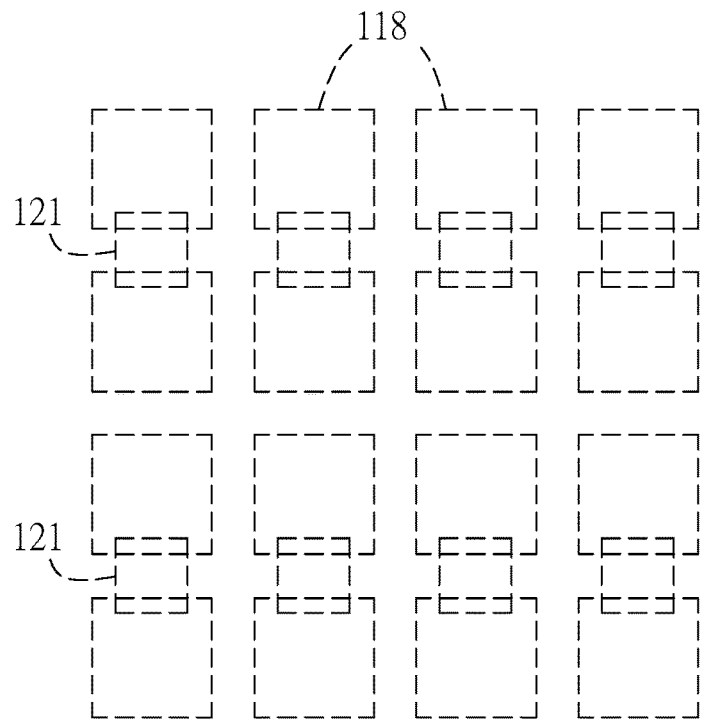
FIG. 3B is a schematic view showing another embodiment regarding to the correspondence between the liquid crystal control areas and the photo-sensing areas of the cholesteric liquid crystal writing board of this disclosure.
Figure 3C:
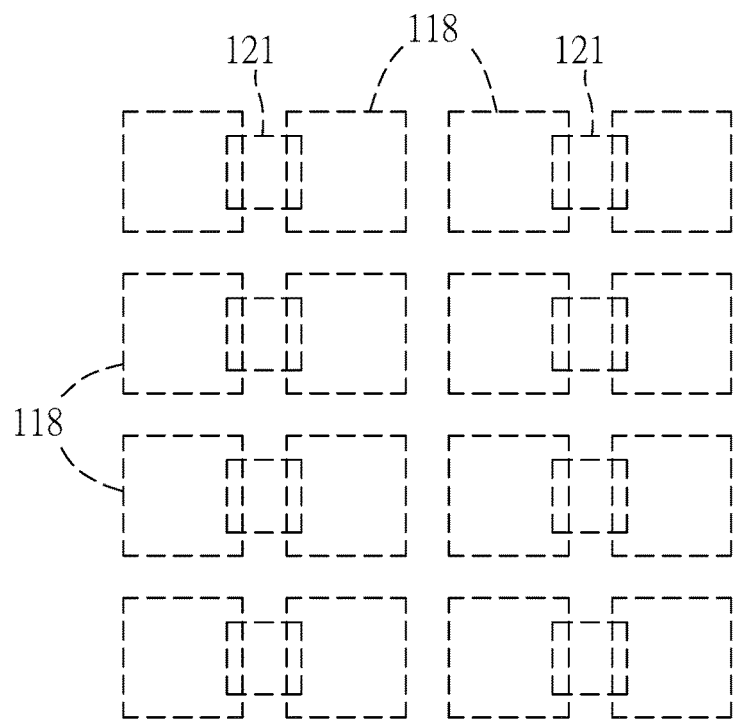
FIG. 3C is a schematic view showing still another embodiment regarding to the correspondence between the liquid crystal control areas and the photo-sensing areas of the cholesteric liquid crystal writing board of this disclosure.

As shown in FIG. 2B and FIG. 2C, the first transparent electroconductive layer 114 of this embodiment comprises a plurality of first electrodes 1141 which extend in a first direction D1 and are separately disposed, the second transparent electroconductive layer 115 comprises a plurality of second electrodes 1151 which extend in a second direction D2 and are separately disposed. The first direction D1 is different from the second direction D2. Herein, the first direction D1 and the second direction D2 may form an angle, which comprises, for example but without limiting to, 90 degrees. Hence, from a top view of the light-entering surface A1, the first electrodes 1141 are crossed with the second electrodes 1151 and their intersections are disposed in correspondence to the liquid crystal control areas 118 (see FIG. 2C). Herein, the cholesteric liquid crystal molecules corresponding to the intersection of the first electrode 1141 and the second electrode 1151 can form a liquid crystal control area 118 (see also FIG. 2E), and a liquid crystal control area 118 may be disposed correspondingly to a light-sensing area 121 (for the sake of clarity of the drawing, the light-sensing areas 121 are not shown in FIG. 2C). Alternatively, in other embodiments, as shown in FIG. 3A, multiple (e.g., four) liquid crystal control areas 118 may be also disposed in correspondence to the same one light-sensing area 121. Further alternatively, as shown in FIG. 3B, every two liquid crystal control areas 118 in a column are disposed in correspondence to a light-sensing area 121. Still alternatively, as shown in FIG. 3C, every two liquid crystal control areas 118 in a row are disposed in correspondence to a light-sensing area 121. However, the amount of the liquid crystal control areas 118 that are disposed in correspondence to a light-sensing area 121 and the arrangement of the two components may be adjusted according to practical requirement(s), but this disclosure is not limited thereto.

Referring again to FIGS. 2C to 2E, the main control circuitry 141 of the mode control unit 14 controls a voltage difference between the first electrode 1141 and the second electrode 1151 through the mode switch 142 to control the orientation state of the cholesteric liquid crystal molecules at the intersection region of the first electrode 1141 and the second electrode 1151, thereby controlling the morphological change of the cholesteric liquid crystal molecules. In addition, the cholesteric liquid crystal device 11 may further comprise a sealing layer (not shown). The sealing layer is disposed between the first substrate 111 and the second substrate 112, and seals the outer peripheries of the first substrate 111 and the second substrate 112, so that a gap is formed between the first substrate 111 and the second substrate 112. A chamber may be formed by the first substrate 111, the second substrate 112 and the sealing layer, so that the cholesteric liquid crystal molecules may be filled into the chamber to form the cholesteric liquid crystal layer 113. It is noted that in this embodiment, the light-entering surface A1 of the cholesteric liquid crystal device 11 refers to the upper surface of the first substrate 111 which is disposed opposite to (or away from) the cholesteric liquid crystal layer 113, and the light-emitting surface A2 refers to the lower surface of the second substrate 112 which is disposed opposite to (or away from) the cholesteric liquid crystal layer 113. Alternatively, the light-entering surface A1 may refer to the upper surface of the cholesteric liquid crystal layer 113 facing toward the first substrate 111, and the light-emitting surface A2 may refer to the lower surface of the cholesteric liquid crystal layer 113 facing toward the second substrate 112, or any combination of the preceding examples, but the present disclosure is not limited thereto.

In this embodiment, the first substrate 111 and the second substrate 112 may individually comprise a transparent substrate, and may be a flexible transparent substrate or a rigid transparent substrate. The material of the flexible transparent substrate comprises, for example but without limiting to, polyimide (PI), polycarbonate (PC) or polyethylene terephthalate (PET). The material of the rigid transparent substrate comprises, for example but without limiting to, glass, quartz or sapphire. If the first substrate 111 and the second substrate 112 are both made of the flexible transparent material(s), then the cholesteric liquid crystal writing board 1 may be made into a curved display because such transparent substrate is flexible. In addition, the first transparent electroconductive layer 114 and the second transparent electroconductive layer 115 may be, for example but without limiting to, indium tin oxide (ITO) or indium zinc oxide (IZO), but the present disclosure is not limited thereto.

The circuit structure of the light-sensing areas 121 of the cholesteric liquid crystal writing board 1 of this embodiment will be described hereinafter.

Referring to FIG. 2D, in this embodiment, a control end of the switch element 1212 connects to one of the gate control lines Gn and Gn+1, a first end of the switch element 1212 connects to one of the mode control lines Mm, Mm+1 and Mm+2, a second end of the switch element 1212 connects to one end of the light-sensing element 1211, and the other end of the light-sensing element 1211 connects to the reference voltage Vref. Herein, the reference voltage Vref may be, for example but without limiting to, a common voltage (Vcom), a gate voltage (Vgate) or a grounding voltage (Vgnd) or the like, according to practical requirements. The switch element 1212 may be, for example, a thin film transistor, and the light-sensing element 1211 may be made using the same process and material as the switch element 1212 to save costs. In addition, the mode switch 142 is coupled to a corresponding mode control line Mm, Mm+1 or Mm+2, and the mode control lines Mm, Mm+1 and Mm+2 are coupled to the sensing signal processing unit 13 and the mode control unit 14 through the mode switches 142. Each of the sensing signal processing unit 13 and the mode control unit 14 may be implemented by way of, for example but without limiting to, an integrated circuit or a microchip, and the mode switches 142 can be implemented by way of, for example but without limiting to, an integrated circuit or a switch circuit. Accordingly, the position detection can be carried out by obtaining difference(s) of the various photoelectric currents caused by the luminous flux change generated upon the light-sensing element 1211 being irradiated by the light or not, or irradiated with various irradiation amounts/intensities in the voltage output mode M1.

In details, in the light-sensing area 121 on the top-left corner of FIG. 2D, a gate of the switch element 1212 (thin film transistor) is connected to the gate control line Gn (one gate control line Gn is coupled to multiple switch elements 1212 in a row), a first end (source) thereof is connected to the mode control line Mm (one mode control line Mm is coupled to multiple switch elements 1212 in a column), a second end (drain) thereof is connected to one end of the light-sensing element 1211, and another end of the light-sensing element 1211 is connected to a common voltage (Vcom), such as the ground. Hence, when the signals transmitted via the gate control lines Gn and Gn+1 turn on the switch elements 1212, the sensing signal processing unit 13 can receive the sensing signal Ss generated by the light-sensing element 1211 due to the luminous flux change through the switch element 1212 and the mode control lines Mm, Mm+1 and Mm+2 through the corresponding mode switch 142 in the voltage output mode M1, and obtains the position data according to the received sensing signal Ss. The position data comprises the position (or coordinate) information about where the light-sensing element 1211 locates in the photo-sensing array layer 12.

In this embodiment, the sensing signal processing unit 13 is coupled to the light-sensing areas 121 of the photo-sensing array layer 12 through the mode switches 142, respectively. Herein, one mode switch 142 is coupled to one mode control line and thus coupled to a plurality of light-sensing areas 121 in a column. When the mode switch 142 is in the voltage output mode M1, one or more of the light-sensing elements 1211 in the light-sensing areas 121 of the photo-sensing array layer 12 can detect the luminous flux change so as to generate a sensing signal Ss, which is a voltage signal. Herein, the light-sensing element 1211 is an element that can generate voltage after being irradiated by light. Accordingly, the sensing signal processing unit 13 can receive a sensing signal Ss and generate the position data of the light-sensing element 1211, which generates the sensing signal Ss, in the photo-sensing array layer 12. In other words, the sensing signal processing unit 13 can obtain the position of the light-sensing element 1211, which generates the sensing signal Ss, in the photo-sensing array layer 12 accordingly. The luminous flux change can be generated in the following situations. (1) The luminous flux change can be generated when the cholesteric liquid crystal device 11 is pressed to have morphological change. (2) The luminous flux change can also be generated when the light-entering surface A1 of the cholesteric liquid crystal device 11 is irradiated by a light L.

As shown in FIG. 2D, the communication unit 16 is coupled to the sensing signal processing unit 13, and the cholesteric liquid crystal writing board 1 is communicational connected with the electronic device 2 via the communication unit 16. In order to achieve the communicational connection, the electronic device 2 has a corresponding communication unit with the cholesteric liquid crystal writing board 1 in order to achieve the communicational connection therebetween. The communication unit 16 may be a wireless communication module or a wired communication module, and the wireless communication module may be selected from the group consisting of a Wi-Fi module, a bluetooth module, a telecommunication communication module (such as 3G or 4G) and a combination thereof. This disclosure is not limited. The sensing signal processing unit 13 can output a display control signal Ds corresponding to the above-mentioned position data, and the communication unit 16 can receive the display control signal Ds and transmit the display control signal Ds to the electronic device 2. Accordingly, the electronic device 2 can generate a corresponding control action, thereby generating the desired interactive action and expanding the application of the cholesteric liquid crystal writing board 1. For example, when the electronic device 2 and the cholesteric liquid crystal writing board 1 are installed with corresponding application software, and the electronic device 2 and the cholesteric liquid crystal writing board 1 are communicational connected, the user can write (press) on the cholesteric liquid crystal writing board 1 (under a writing mode) to generate a writing track S (see FIG. 1). In this case, the display control signal Ds transmitted by the communication unit 16 will contain a command to request the electronic device 2 to show the corresponding (or the same) writing track, so that the electronic device 2 can display the same (scale) pressed position or writing track S and the corresponding color. Alternatively, when the cholesteric liquid crystal writing board 1 is under an erasing mode and the user makes a motion to erase (or clear) the writing track S on the cholesteric liquid crystal writing board 1, the display control signal Ds will contain a command to request the electronic device 2 to erase the writing track S, so that the electronic device 2 can clear (erase) the displayed writing track. Therefore, the cholesteric liquid crystal writing board 1 can be used in an interactive writing system, such as teaching or meetings, so as to achieve the purposes of lower cost and instant interactive action. Moreover, the cholesteric liquid crystal writing board 1 can further comprise a memory unit (not shown) for storing the above-mentioned position data and the display control signal Ds outputted from the sensing signal processing unit 13.

Hereinafter, how the cholesteric liquid crystal writing board 1 performs the transmission of the corresponding display control signals under the writing mode will be described. That is, when the luminous flux changes are occurred in the cholesteric liquid crystal device 11 due to the morphological change, how the cholesteric liquid crystal writing board 1 obtains the occurrence position of the morphological change of the cholesteric crystal molecules (or the luminous flux change). In this case, the luminous flux change shown in FIG. 2E is generated after the at least a part of the cholesteric liquid crystal layer 113 is pressed to generate the morphological change, which represents that the cholesteric liquid crystal writing board 1 is under the above-mentioned writing mode.

Please refer again to FIG. 1 and through FIG. 2A to FIG. 2E. In the cholesteric liquid crystal writing board 1 of this embodiment, when the cholesteric liquid crystal device 11 is not pressed and is not supplied with the power, the cholesteric liquid crystal molecules of the cholesteric liquid crystal layer 113 are orientated in a focal conic state. At this time, most of the incident light L1 may pass through the cholesteric liquid crystal layer 113, and a small portion of the incident light L1 is scattered. Hence, the user can see the background color of the cholesteric liquid crystal writing board 1, such as black, at this time. When the user writes on the cholesteric liquid crystal writing board 1 with a stylus (or a finger or other solid objects) to press the cholesteric liquid crystal device 11, the gap between the first substrate 111 and the second substrate 112 becomes smaller, and the orientation of the cholesteric liquid crystal molecules in corresponding portion of the cholesteric liquid crystal layer 113 are morphologically changed from the original focal conic state to the planar state. At this time, partial of the incident light L2 has a Bragg reflection occurred at the pressed position (i.e. the central dent of the first substrate 111 depicted in FIG. 2E), and the reflected light Lr (with a certain wavelength) is emitted from the light-entering surface A1. In the meantime, the cholesteric liquid crystal device 11 displays the color (e.g., green) of the reflected light Lr at the pressed position. Hence, if the user writes a letter, a character, or a word, or draws a figure on the cholesteric liquid crystal writing board 1 to generate a writing track S on the cholesteric liquid crystal device 11, then the writing track S renders the color corresponding to the reflected light Lr.

As mentioned above and as shown in FIG. 2D and FIG. 2E, when there is no portion pressed on the light-entering surface A1 of the cholesteric liquid crystal device 11 or the central portion of the light-entering surface A1 is not pressed, the orientation of the cholesteric liquid crystal molecules in this portion of the cholesteric liquid crystal layer 113 are stayed in the focal conic state. Hence, most of the light (e.g., the incident light L1) incident to this portion may pass through the cholesteric liquid crystal layer 113 and is transmitted to the light-sensing area 121. The light-sensing element 1211 in the light-sensing area 121 can sense the incident light L1 and a first luminous flux is obtained. When the user presses the cholesteric liquid crystal writing board 1, the orientation of at least a portion of the cholesteric liquid crystal molecules in the cholesteric liquid crystal layer 113 corresponding to the pressed position (i.e. the central dent of the light-entering surface A1 in FIG. 2E) will be morphologically changed from the focal conic state to the planar state. At this time, as previously mentioned, partial of the light L2 (i.e., the reflected light Lr) incident to the pressed position is reflected by the cholesteric liquid crystal molecules which are in the planar state and emitted from the light-entering surface A1, and the remaining part of the light L2' may pass through the cholesteric liquid crystal layer 113 and is transmitted to the light-sensing element 1211 in the corresponding light-sensing area 121. At this time, the corresponding light-sensing element 1211 may sense the light L2' and a second luminous flux is obtained. And, the difference between the first luminous flux and the second luminous flux is the luminous flux change sensed by the light-sensing element 1211 in the light-sensing area 121. In this situation, the mode switches 142 has received the mode control signal Ms from the main control circuitry 141 and been switched to the voltage output mode M1, and the sensing signal processing unit 13 can receive (or "reads"), via the mode switches 142 and the mode control lines Mm, Mm+1 and Mm+2, electrical signals (i.e., "sensing signals Ss") corresponding to different voltage values generated by each of the light-sensing elements 1211 sensing the luminous fluxes with various intensities. When the sensing signal processing unit 13 receives this sensing signal(s) Ss, it is obtained that which one, or ones, of the light-sensing elements 1211 transmit this sensing signal(s) Ss. The sensing signal processing unit 13 can obtain the position data according to this sensing signal Ss, and the position data represents or corresponds to the position where the aforementioned one or more of the light-sensing elements 1211 which sense(s) this luminous flux change locate(s) in the photo-sensing array layer 12 (e.g., at which column and row the light-sensing element(s) 1211 locate(s) in the photo-sensing array layer 12). The above-mentioned position data corresponds to or represents the positions where the light-sensing element(s) 1211 which sense(s) this luminous flux change locate(s) in the photo-sensing array layer 12. Thereby, the cholesteric liquid crystal writing board 1 can detect the pressed (or written) position on the cholesteric liquid crystal writing board 1. In addition, the sensing signal processing unit 13 can also output the display control signal Ds corresponding to the position data to the electronic device 2 accordingly. Since the display control signal Ds contains the position information indicating the luminous flux change of which light-sensing element(s) 1211 in the photo-sensing array layer 12, the control circuit of the electronic device 2 can control the display mechanism itself according to the display control signal Ds corresponding to the position data, thereby displaying another writing track on the display surface thereof corresponding to the writing track S on the cholesteric liquid crystal writing board 1.

To be noted, the electronic device 2 of FIG. 2D can be another cholesteric liquid crystal device, liquid crystal display device (e.g., for example but not limited to TN, MV, IPS, FFS or other types of LCD device), or OLED display device. In this embodiment, the electronic device 2 is, for example, another cholesteric liquid crystal device having the same structure as the above-mentioned cholesteric liquid crystal device 11. Since the display control signal Ds received by the electronic device 2 comprises the position information of the pressed portion (writing track S), for example, the mode control unit of the electronic device 2 (cholesteric liquid crystal device) can control the morphological change of the cholesteric liquid crystal molecules at the position in correspondence with the above-mentioned position data.

Hereinafter, how the cholesteric liquid crystal writing board 1 performs the transmission of the corresponding display control signals under the erasing mode will be described. Herein, the details of the luminous flux changes, which are occurred after the light-entering surface A1 of the cholesteric liquid crystal device 11 is irradiated by the light L, will be described. In this mode, the luminous flux changes shown in FIG. 2H are occurred after the light-entering surface A1 of the cholesteric liquid crystal device 11 is irradiated by the light L.

Figure 2F:
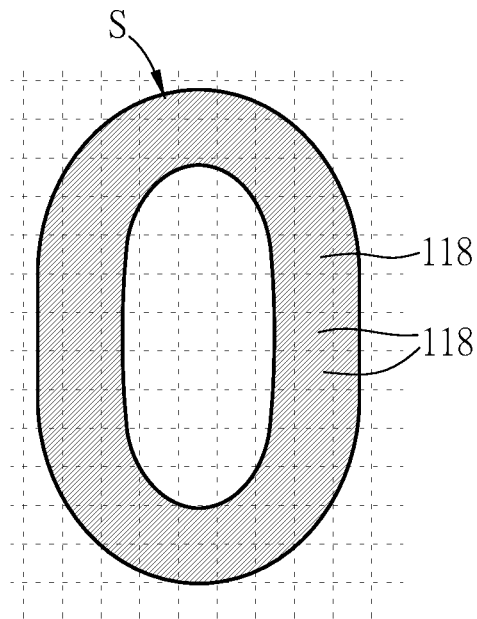
FIG. 2F is a schematic partial enlarged view of the writing track of FIG. 1.
Figure 2G:
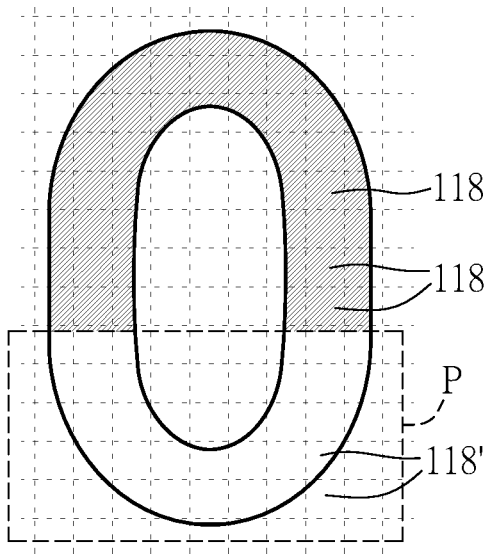
FIG. 2G is a schematic status diagram showing that a part of the writing track of FIG. 2F is erased.
Figure 2H:
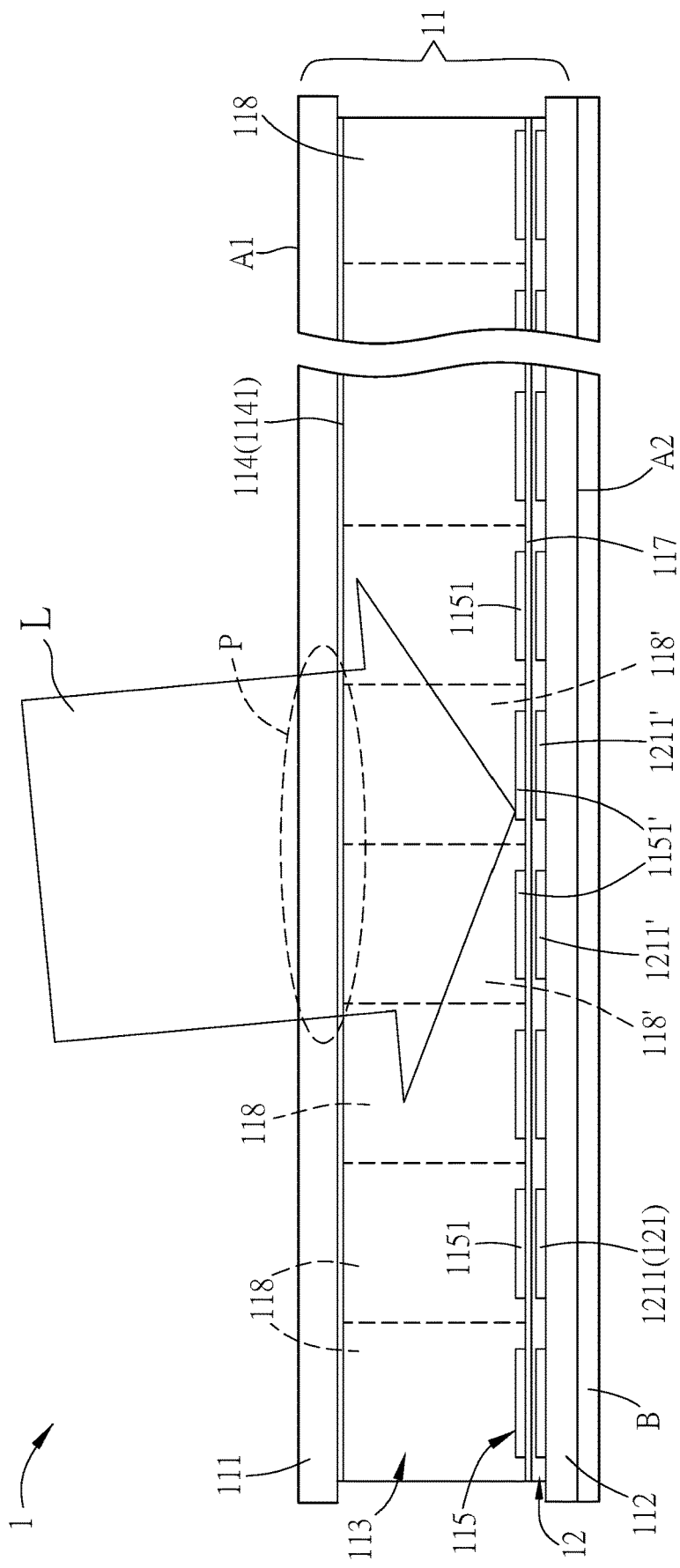
FIG. 2H is a schematic diagram showing the cholesteric liquid crystal writing board of FIG. 1, which is irradiated by a light.

FIG. 2F is a schematic partial enlarged view of the writing track of FIG. 1, FIG. 2G is a schematic status diagram showing that a part of the writing track of FIG. 2F is erased, and FIG. 2H is a schematic diagram showing the cholesteric liquid crystal writing board of FIG. 1, which is irradiated by a light. To be noted, FIG. 2H does not show the sensing signal processing unit 13 and the mode control unit 14. Referring to FIG. 2D in view of FIGS. 2F to 2H, as mentioned above, when the mode switch 142 is in the voltage output mode M1, the sensing signal Ss can be transmitted to the sensing signal processing unit 13, so that the position data of the light-sensing element 1211 in the photo-sensing array layer 12 can be obtained accordingly. If the luminous flux change is generated after the light-entering surface A1 of the cholesteric liquid crystal device 11 is irradiated by the light L, it means that the cholesteric liquid crystal writing board 1 is in the erasing mode. Except the sensing signal Ss, the sensing signal processing unit 13 can also output an erasing signal Ps to the main control circuitry 141 according to the position data. After receiving the erasing signal Ps, the main control circuitry 141 can output a mode control signal Ms accordingly to one or more of the mode switches 142 corresponding to the position data so as to switch the one or more of the mode switches 142 to the voltage write mode M2. In this time, the main control circuitry 141 can output a voltage signal Vs according to the erasing signal Ps via the mode switch 142, which has been switched to the voltage write mode M2, to the liquid crystal control area 118 corresponding to the position data, thereby controlling partial or all of the liquid crystals. In details, when the mode switch 142 is in the voltage write mode M2, the main control circuitry 141 of the mode control unit 14 can receive the erasing signal Ps corresponding to the position data having the luminous flux change (caused by the irradiation of the light L). The position data comprise the position (or coordinate) information about where the light-sensing element 1211 locates in the area of the cholesteric liquid crystal device 11 irradiated by the light L. The main control circuitry 141 outputs the mode control signal Ms according to the position data (the erasing signal Ps) to the mode switches 142 corresponding to the position data so as to switch the mode switches 142 to the voltage write mode M2, and the mode switches 142 output the voltage signal Vs to the liquid crystal areas 118 corresponding to the position data. Accordingly, partial or all of the cholesteric liquid crystal molecules in the liquid crystal control areas 118 can be morphologically changed for clearing a part or all of the writing track S. In other words, when the light L irradiates the cholesteric liquid crystal device 11 and the photo-sensing array layer 12 detects the sensing signal Ss generated according to the luminous flux change, the position of the light-sensing element 1211 in the photo-sensing array layer 12 can be obtained, thereby obtaining the irradiated region P of the cholesteric liquid crystal device 11 irradiated by the light L. Later, by using the main control circuitry 141 of the mode control unit 14 to control the cholesteric liquid crystal molecules in partial or all of the liquid crystal control areas 118 corresponding to the irradiation region P to undergo a morphological change, the writing track S in the irradiation region P of the cholesteric liquid crystal writing board 1 can be erased, partially or entirely.

Hereinafter, it is to describe how the cholesteric liquid crystal writing board 1 obtains the occurrence position of a luminous flux change and thus obtains the irradiation position of the light L on the cholesteric liquid crystal device 11 when the luminous flux changes are occurred in the cholesteric liquid crystal device 11.

Please refer again to through FIG. 2D to FIG. 2H. In the cholesteric liquid crystal writing board 1 of this embodiment, when the user presses the cholesteric liquid crystal writing board 1 to write a letter, a character, or a word, or to draw a figure on the cholesteric liquid crystal writing board 1 so as to generate the writing track S (e.g., a "LOGO" pattern shown in FIG. 1), the light-sensing elements 1211 in the light-sensing area 121 corresponding to the writing track S may sense the luminous flux of the environment light transmitted to the photo-sensing array layer 12 sequentially through the first substrate 111 and the cholesteric liquid crystal layer 113, and a first luminous flux is obtained accordingly. When the user wants to erase (delete or clear) partial or all of the writing track S, the light L can be used to irradiate the to-be-erased portion of the writing track S (e.g., the irradiation region P of FIG. 2G and FIG. 2H). The irradiation region P may be equal to or larger than the portion to be erased. In this embodiment, the irradiation region P (the dashed rectangle as shown in FIG. 2G) is larger than the to-be-erased portion (the lower part of "0" filled with white color as shown in FIG. 2G) as an example for explanation. The intensity of the light L is preferably greater than the intensity of the ambient light, and the wavelength of the light L may be located in the range of a visible light (e.g., red, blue or green light) or in the range of an invisible light (e.g., near-infrared light, far-infrared light or ultraviolet light). When the light L irradiates the light-entering surface A1 of the cholesteric liquid crystal device 11 (as the irradiation region P in FIG. 2G and FIG. 2H), it also passes through the first substrate 111 and the cholesteric liquid crystal layer 113 and travels to the photo-sensing array layer 12. At this time, the light-sensing element 1211' in the corresponding light-sensing area 121 under the irradiation region P of the light L can sense the luminous flux of the light L emitted thereon, and a third luminous flux is obtained accordingly. Moreover, the difference between the first luminous flux and the third luminous flux is the luminous flux change sensed by the light-sensing element 1211' in the light-sensing area 121. In this embodiment, the third luminous flux sensed by the light-sensing element 1211' is greater than the first luminous flux. Hence, the luminous flux change sensed by the one or more of the light-sensing elements 1211' in the light-sensing area 121 is positive. However, the luminous flux change sensed by the light-sensing elements 1211 not irradiated by the light L is 0 (i.e., the third luminous flux sensed thereby is equal to the first luminous flux). Accordingly, as shown in FIG. 2D, the sensing signal processing unit 13, which couples to the mode control lines Mm, Mm+1 and Mm+2, can receive (or "read"), via the mode switches 142 in the voltage output mode M1 and the mode control lines Mm, Mm+1 and Mm+2, electrical signals (i.e., "sensing signals Ss") corresponding to different voltage values generated by each of the light-sensing elements 1211 and 1211' sensing the luminous fluxes with various intensities. When the sensing signal processing unit 13 receives this sensing signal(s) Ss, it is obtained that which one, or ones, of the light-sensing elements 1211' transmit this sensing signal(s) Ss. The sensing signal processing unit 13 can obtain the position data according to this sensing signal Ss, and the position data represents or corresponds to the position where the aforementioned one or more of the light-sensing elements 1211' which sense(s) this luminous flux change locate(s) in the photo-sensing array layer 12 (e.g., at which column and row the light-sensing element(s) 1211' locate(s) in the photo-sensing array layer 12). Then, the erasing signal Ps corresponding to the position data can be transmitted to the main control circuitry 141 of the mode control unit 14, so that the main control circuitry 141 can obtain the position data of one or more of the light-sensing elements 1211' in the photo-sensing array layer 12 having luminous flux change. The position data comprise the position about where the light-sensing element 1211' locates in the irradiation region P of the light-entering surface A1 of the cholesteric liquid crystal device 11 irradiated by the light L. After receiving the erasing signal Ps, the main control circuitry 141 can control to switch the one or more of the mode switches 142 from the voltage output mode M1 to the voltage write mode M2. Then, the main control circuitry 141 outputs the voltage signal Vs to the first electrode 1141 and the second electrode 1151' of the liquid crystal areas 118' (in FIG. 2H, two liquid crystal control areas 118' are taken as an example) corresponding to the irradiation region P through the mode switch 142 and the mode control lines Mm, Mm+1 and Mm+2, so that the orientation of cholesteric liquid crystal molecules between the first electrode 1141 and the second electrode 1151' can be changed to the focal conic state from the original planar state, so as to allow a light to substantially penetrate through the cholesteric liquid crystal layer 113 and to render the background color of the cholesteric liquid crystal device 11. Hence, the portions of the writing track S shown on the cholesteric liquid crystal writing board 1 irradiated by the light L can be erased, either partially or entirely.

In addition, since the position data comprise a signal for clearing (or erasing) the writing track S in the irradiation region P, the display control signal Ds outputted by the sensing signal processing unit 13 can also contain the clear (or erase) signal of the writing track in the corresponding region of the electronic device 2. This display control signal Ds containing the clear (or erase) signal of the writing track in the corresponding region of the electronic device 2 can be transmitted to the electronic device 2 through the communication unit 16, so that the electronic device 2 can erase the corresponding writing track, partially or entirely. In this embodiment, the electronic device 2 is another cholesteric liquid crystal device, so the display control signal Ds received by the electronic device 2 can be transmitted to the mode control unit thereof. Accordingly, in the electronic device 2, partial or all of the cholesteric liquid crystal molecules in the liquid crystal control areas corresponding to the irradiation region P of the cholesteric liquid crystal writing board can be morphologically changed for clearing a part or all of the writing track of the electronic device 2.

In addition, the mode switch 142 can be switched to the voltage output mode M1 within a frame time, and be switched to the voltage write mode M2 within another frame time. In more detailed, the sensing signal processing unit 13 can read the sensing signal Ss via the mode switch 142 within a certain frame time, and the main control circuitry 141 of the mode control unit 14 can switch the mode switch 142 to the voltage write mode M2 within the next frame time for transmitting the voltage signal Vs from the main control circuitry 141 to the cholesteric liquid crystal device 11, thereby clearing a part or all of the writing track S.

In addition, in some embodiments, when the user presses a clear button (virtual or physical button) on the cholesteric liquid crystal writing board 1 (or the user switches the cholesteric liquid crystal writing board 1 to an all clean mode), the main control circuitry 141 of the mode control unit 14 can switch all mode switches 142 to the voltage write mode M2, and the main control circuitry 141 transmits the voltage signal Vs to all liquid crystal control areas 18 for morphologically changing all cholesteric liquid crystal molecules so as to clear the entire writing track S.

To be noted, the display control signal Ds can be transmitted to the electronic device 2 when the gate control lines Gn and Gn+1 turn on. Alternatively, the display control signal Ds may be transmitted to the electronic device 2 in a blanking time after the gate control lines Gn and Gn+1 turn on. In other words, the display control signals Ds may be transmitted to the electronic device 2 while the gate control lines Gn and Gn+1 sequentially turn on. Alternatively, all display control signals Ds may be transmitted once (non-immediately) to the electronic device 2 in the blanking time after all gate control lines Gn and Gn+1 have turned on and before the next time that they are turned on, but the present disclosure is not limited thereto.

In other embodiments (explanations are made according to FIG. 2E), the first transparent electroconductive layer 114 may be a whole electrode, and is comprehensively disposed on the surface of the first substrate 111 facing toward the cholesteric liquid crystal layer 113. The second transparent electroconductive layer 115 may comprise electrode blocks (still labeled as 1151) arranged in an array, and the electrode blocks 1151 are respectively disposed in correspondence with the liquid crystal control areas 118 or the light-sensing areas 121 or light-sensing elements 1211 arranged in an array. The electrode blocks 1151 and the first transparent electroconductive layer 114 can correspondingly control the liquid crystal control areas 118. Herein, "comprehensively" means that the first transparent electroconductive layer 114 comprises a whole common electrode, which fully covers most of the surface of the first substrate 111 facing toward the cholesteric liquid crystal layer 113. One electrode block 1151 of the second transparent electroconductive layer 115 may correspond to a pixel electrode and correspondingly control a liquid crystal control area 118 together with the first transparent electroconductive layer 114. Hence, the voltage signal Vs may be applied to the first transparent electroconductive layer 114 and the electrode blocks 1151 (i.e., pixel electrode) in the liquid crystal control area(s) 118 corresponding to the writing track S, so that the orientation of the cholesteric liquid crystal molecules in the corresponding liquid crystal control areas 118 can be changed to the focal conic state, so as to partially or entirely erase the portion(s) of the writing track S on the cholesteric liquid crystal writing board 1 irradiated by the light L.

Figure 3D:
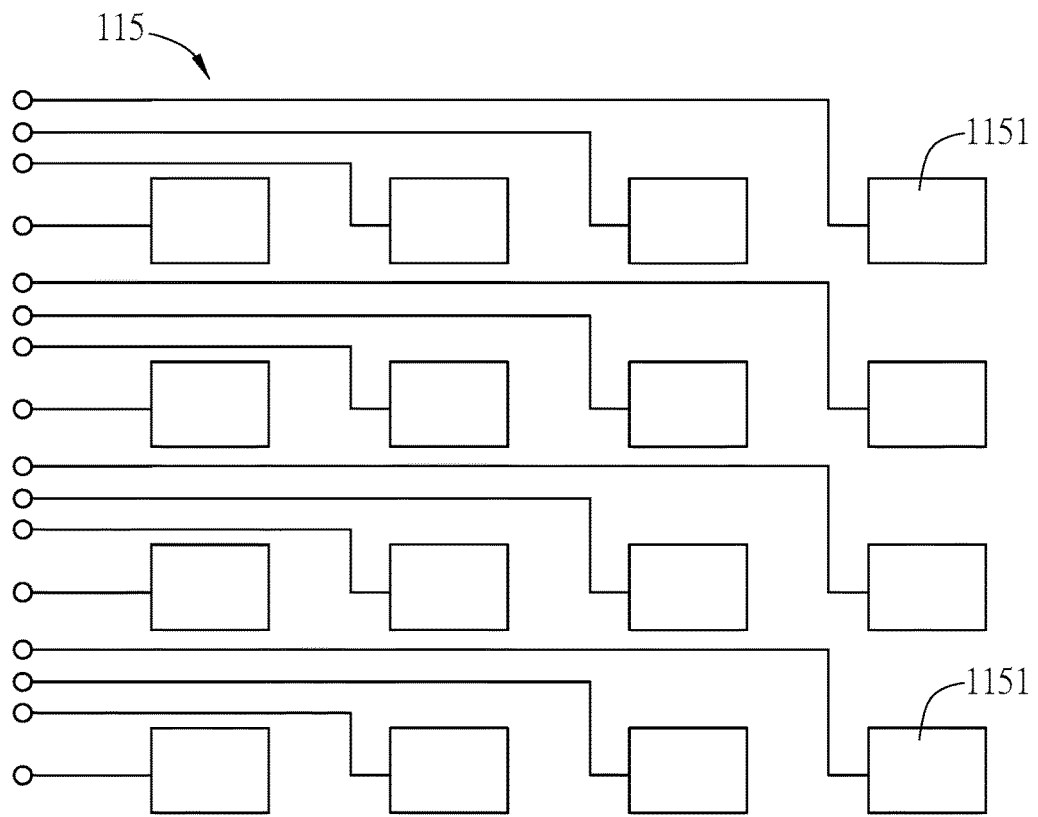
FIG. 3D is a schematic view showing another embodiment of a second transparent electroconductive layer of the cholesteric liquid crystal writing board of this disclosure.
Figure 3E:
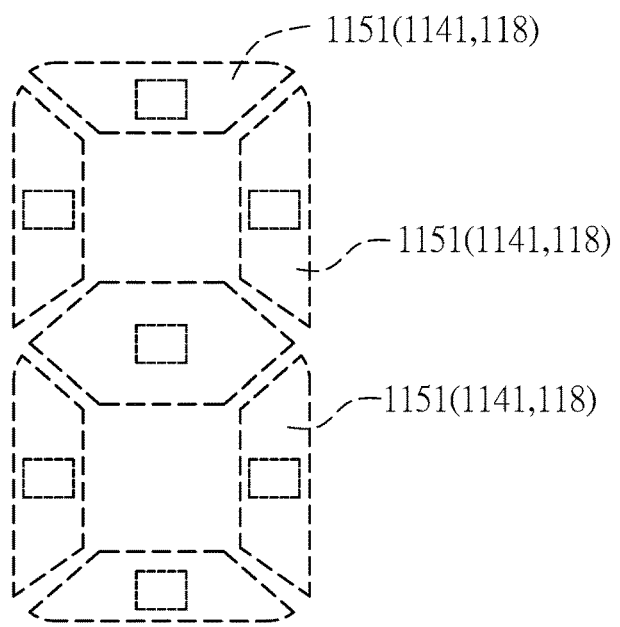
FIG. 3E is a schematic view showing another embodiment of the first transparent electroconductive layer and the second transparent electroconductive layer of the cholesteric liquid crystal writing board of this disclosure.

Alternatively, in other embodiments, as shown in FIG. 3D, which is a schematic view showing another embodiment of a second transparent electroconductive layer of the cholesteric liquid crystal writing board of this disclosure. The first transparent electroconductive layer 114 or the second transparent electroconductive layer 115 may comprise a plurality of electrode blocks 1151. The electrode blocks 1151 are disposed in correspondence with the liquid crystal control areas 118, and the voltage signal Vs may be applied to the electrode blocks 1151 of the liquid crystal control areas 118 corresponding to the writing track S, so that the orientation of the cholesteric liquid crystal molecules in the corresponding liquid crystal control area(s) 118 can be changed to the focal conic state so as to partially or entirely erase the writing track S on the cholesteric liquid crystal writing board 1 irradiated by the light L. In this embodiment, for example, the second transparent electroconductive layer 115 comprises a plurality of electrode blocks 1151 arranged in an array. The electrode blocks 1151 are respectively disposed in correspondence with the liquid crystal control areas 118 or the light-sensing elements 1211 arranged in an array, and the electrode blocks 1151 and the first transparent electroconductive layer 114 can correspondingly control the liquid crystal control areas 118. Herein, the electrode block 1151 may be polygonal (e.g., square), circular, or oval, or in other shapes, and this disclosure is not limited. Alternatively, in other embodiments, the first transparent electroconductive layer 114 may also comprise a plurality of electrode blocks 1141, and the second transparent electroconductive layer 115 comprises a whole common electrode. Further alternatively, as shown in FIG. 3E, each of the first transparent electroconductive layer 114 and the second transparent electroconductive layer 115 independently comprises a plurality of electrode blocks 1141 and 1151 disposed in correspondence with each other, and each of the electrode blocks 1141 and 1151 are disposed corresponding to the liquid crystal control areas 118. In FIG. 3E, for example, the electrode blocks 1141 and 1151 are correspondingly arranged as "seven-segmented blocks." A light-sensing area 121 is correspondingly provided in each of the liquid crystal control areas 118. As previously mentioned, the amount, configuration, location, and shape of the electrode blocks may be adjusted according to the practicing requirements, but the present disclosure is not limited thereto.

Referring to FIGS. 2E and 2H again, the cholesteric liquid crystal device 11 further comprises an insulating layer 117, and the second transparent electroconductive layer 115, the insulating layer 117 and the photo-sensing array layer 12 are sequentially stacked on a surface of the second substrate 112 facing toward the cholesteric liquid crystal layer 113. In addition, the cholesteric liquid crystal writing board 1 of this embodiment may further comprise a backing plate B disposed on one side of the second substrate 112 facing toward the light-emitting surface A2. Herein, the backing plate B may be a black light-absorbing plate (or containing a light-absorbing film) or a white light-reflecting plate (or containing a light-reflecting film). When the backing plate B is the black light-absorbing plate (or the light-absorbing film), it absorbs the light that passes through the cholesteric liquid crystal device 11 and makes the cholesteric liquid crystal writing board 1 become a blackboard. In some embodiments, the material of the black light-absorbing plate (or the light-absorbing film) may be the same as the material of the black matrix of the liquid crystal display device. In addition, when the backing plate B is a white light-reflecting plate (or the light-reflecting film), it reflects the light that passes through the cholesteric liquid crystal device 11 and makes the cholesteric liquid crystal writing board 1 become a whiteboard. In some embodiments, the material of the white light reflective plate (or the light-reflecting film) may comprise, for example, metal, metal oxide, a highly reflective paint (white paint) or a combination thereof, but the present disclosure is not limited thereto. Alternatively, in different embodiments, the color of the backing plate B is also not limited to white, and may be one of other colors or a combination of multiple colors.

Please refer to FIG. 4A to FIG. 4D, which are schematic structure views showing various embodiments of the cholesteric liquid crystal writing board of this disclosure, respectively. In FIG. 4A to FIG. 4D, the sensing signal processing unit 13, the mode control unit 14 and the communication unit 16 are omitted.

Figure 4A:
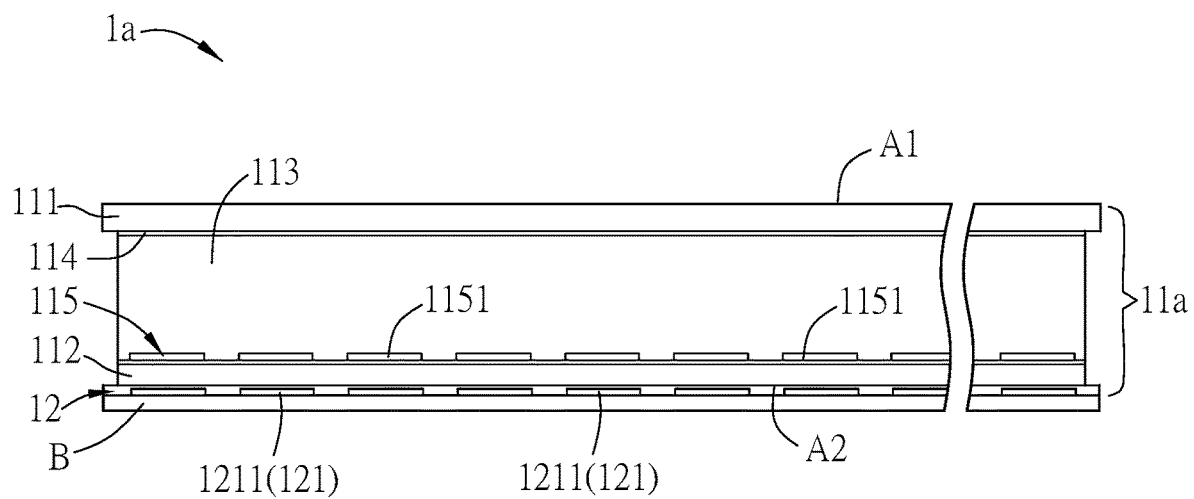
FIG. 4A to FIG. 4D are schematic structure views showing various embodiments of the cholesteric liquid crystal writing board of this disclosure, respectively.

As shown in FIG. 4A, the cholesteric liquid crystal writing board 1a of this embodiment and the cholesteric liquid crystal writing board 1 of the foregoing embodiment are substantially the same in the composition and the connection relationship of the components. The difference is that the insulating layer 117 is not provided in a cholesteric liquid crystal writing board 1a of this embodiment. The second transparent electroconductive layer 115 is disposed on the surface of the second substrate 112 facing toward the cholesteric liquid crystal layer 113. The photo-sensing array layer 12 is disposed on the surface of the second substrate 112 opposite to (or away from) the cholesteric liquid crystal layer 113, and between the backing plate B and the second substrate 112.

Figure 4B:
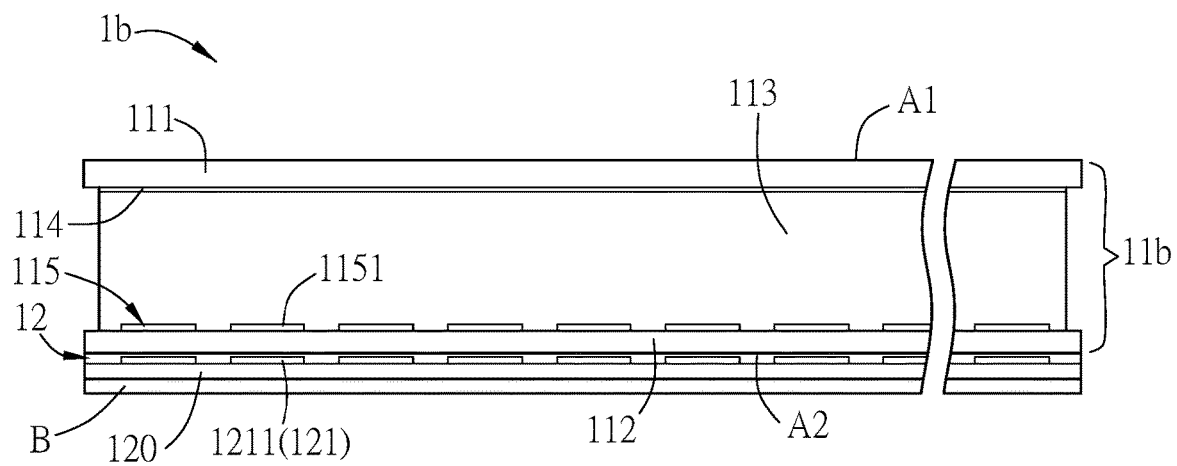

As shown in FIG. 4B, the cholesteric liquid crystal writing board 1b of this embodiment and the cholesteric liquid crystal writing board 1 of the foregoing embodiment are also substantially the same in the composition and the connection relationship of the components. The difference is that, in the cholesteric liquid crystal writing board 1b of this embodiment, the photo-sensing array layer 12 further comprises a third substrate 120, and the light-sensing elements 1211 arranged in an array are disposed on a surface of the third substrate 120 facing toward the second substrate 112. The photo-sensing array layer 12 is disposed on one side of the second substrate 112 opposite to (or away from) the cholesteric liquid crystal layer 113. In other words, the photo-sensing array layer 12 is disposed outside of the cholesteric liquid crystal device 11, and is located on the side of the light-emitting surface A2 of the cholesteric liquid crystal device 11. In this embodiment, the applicable material for the third substrate 120 may be the same as those can be used in the first substrate 111 and the second substrate 112 of the cholesteric liquid crystal writing board 1 in the foregoing embodiment, and may be a flexible transparent material or a rigid transparent material.

Figure 4C:
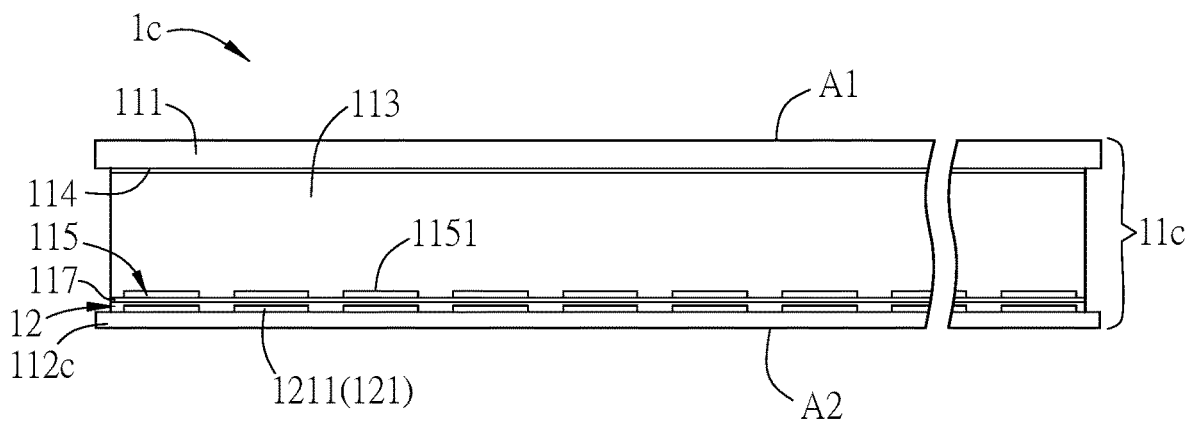

As shown in FIG. 4C, the cholesteric liquid crystal writing board 1c of this embodiment and the cholesteric liquid crystal writing board 1 of the foregoing embodiment are also substantially the same in the composition and the connection relationship of the components. The difference is that the backing plate B is not provided in a cholesteric liquid crystal writing board 1c of this embodiment. The first substrate 111 is still a transparent substrate, but the second substrate 112c is a black light-absorbing substrate or a white light-reflecting substrate. In this embodiment, the second substrate 112c also has both functions of the second substrate 112 and the backing plate B in the foregoing embodiment.

Figure 4D:
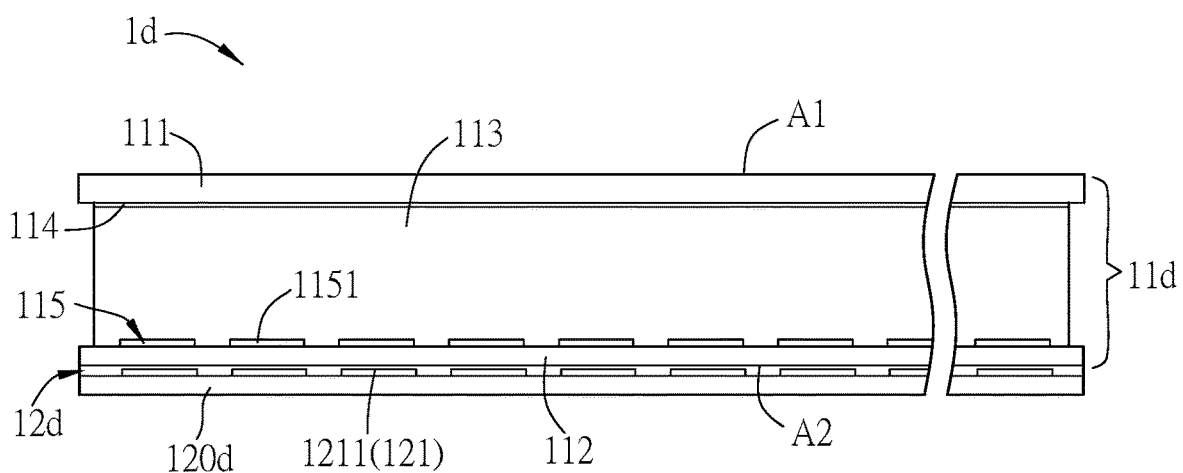

As shown in FIG. 4D, the cholesteric liquid crystal writing board 1d of this embodiment and the cholesteric liquid crystal writing board 1 of the foregoing embodiment are also substantially the same in the composition and the connection relationship of the components. The difference is that the backing plate B is also not provided in a cholesteric liquid crystal writing board 1d of this embodiment. A photo-sensing array layer 12d further comprises a third substrate 120d, the light-sensing elements 1211 arranged in an array are disposed on a surface of the third substrate 120d facing toward the second substrate 112, and the photo-sensing array layer 12d is disposed on one side of the second substrate 112 opposite to (or away from) the cholesteric liquid crystal layer 113. In other words, the photo-sensing array layer 12d is disposed outside the cholesteric liquid crystal device 11, and is located on one side of the cholesteric liquid crystal device 11 facing toward the light-emitting surface A2. Meanwhile, the first substrate 111 and the second substrate 112 are still transparent substrates, but the third substrate 120d is a black light-absorbing plate or a white light-reflecting plate, or a plate of other colors. In other words, in this embodiment, the third substrate 120d also has both functions of the third substrate 120 and the backing plate B in the foregoing embodiment. Because the photo-sensing array layer 12d is disposed outside of the cholesteric liquid crystal device 11, no insulating layer is necessary to be provided on the second substrate 112.

To sum up, in the cholesteric liquid crystal writing board of this disclosure, the cholesteric liquid crystal device comprises a cholesteric liquid crystal layer, and the photo-sensing array layer is disposed at one side of the light-emitting surface of the cholesteric liquid crystal device; the photo-sensing array layer comprises a plurality of gate control lines and a plurality of mode control lines, the gate control lines and the mode control lines are intersected to define a plurality of light-sensing areas arranged in an array, and each of the light-sensing areas is configured with a switch element and a light-sensing element; and the mode control unit comprises a main control circuitry and a plurality of mode switches coupled to the main control circuitry, each of the mode switches is coupled to one of the mode control lines correspondingly, and the main control circuitry controls each of the mode switches to be switched between a voltage output mode and a voltage write mode. The cholesteric liquid crystal writing board of the present disclosure utilizes the properties of the cholesteric liquid crystals, so that it can achieve power-saving, and obtain the position information of the cholesteric liquid crystal writing board having luminous flux change in the voltage output mode. Accordingly, the cholesteric liquid crystal writing board can perform a corresponding control action, such as to perform a partial erasing action and/or to have interactive action with another electronic device. This feature can expand the application of the cholesteric liquid crystal writing board (e.g., in the interactive writing system for interactive teaching or interactive conference) and achieve the purposes of lower cost and instant interactive action.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:

1. A cholesteric liquid crystal writing board, comprising:
a cholesteric liquid crystal device comprising a cholesteric liquid crystal layer, wherein the cholesteric liquid crystal device has a light-entering surface and a light-emitting surface disposed corresponding to the light-entering surface;
a photo-sensing array layer disposed at one side of the light-emitting surface of the cholesteric liquid crystal device, wherein the photo-sensing array layer comprises a plurality of gate control lines and a plurality of mode control lines, the gate control lines and the mode control lines are intersected to define a plurality of light-sensing areas arranged in an array, and each of the light-sensing areas is configured with a switch element and a light-sensing element;
a mode control unit comprising a main control circuitry and a plurality of mode switches coupled to the main control circuitry, wherein each of the mode switches is coupled to one of the mode control lines correspondingly, and the main control circuitry controls each of the mode switches to be switched between a voltage output mode and a voltage write mode; and
a sensing signal processing unit coupled to the photo-sensing array layer through the mode switches, wherein when each of the mode switches is in the voltage output mode, at least one of the light-sensing elements of the photo-sensing array layer senses a luminous flux change so as to generate a sensing signal, and the sensing signal processing unit receives the sensing signal and generates position data of the light-sensing element, which generates the sensing signal, in the photo-sensing array layer accordingly.

2. The cholesteric liquid crystal writing board according to claim 1, wherein the sensing signal processing unit generates an erasing signal according to the position data and transmits the erasing signal to the main control circuitry of the mode control unit, and after receiving the erasing signal, the main control circuitry outputs a mode control signal accordingly to one or more of the mode switches corresponding to the position data so as to switch the one or more of the mode switches to the voltage write mode.

3. The cholesteric liquid crystal writing board according to claim 2, wherein the cholesteric liquid crystal device further comprises a plurality of liquid crystal control areas, and the main control circuitry further outputs a voltage signal according to the erasing signal and transmits the voltage signal to the liquid crystal control area corresponding to the position data through the one or more of the mode switches for partially or entirely morphologically changing cholesteric liquid crystals corresponding to the liquid crystal control areas.

4. The cholesteric liquid crystal writing board according to claim 3, wherein the light-sensing area corresponds to at least one or more of the liquid crystal control areas.

5. The cholesteric liquid crystal writing board according to claim 1, wherein the sensing signal processing unit further outputs a display control signal according to the position data, and the cholesteric liquid crystal writing board further comprises:
a communication unit coupled to the sensing signal processing unit, wherein the communication unit receives the display control signal and transmits the display control signal to an electronic device.

6. The cholesteric liquid crystal writing board according to claim 5, wherein the display control signal is transmitted to the electronic device when the gate control lines are conducted.

7. The cholesteric liquid crystal writing board according to claim 5, wherein the display control signal is transmitted to the electronic device during a blanking time after the gate control lines are conducted.

8. The cholesteric liquid crystal writing board according to claim 5, wherein the display control signal comprises a signal for controlling the electronic device to display a writing track.

9. The cholesteric liquid crystal writing board according to claim 5, wherein the display control signal comprises a signal for controlling the electronic device to erase a writing track.

10. The cholesteric liquid crystal writing board according to claim 1, wherein the luminous flux change is generated after at least partial of the cholesteric liquid crystal layer has a morphologically change caused by a pressing action.

11. The cholesteric liquid crystal writing board according to claim 1, wherein the luminous flux change is generated after the light-entering surface of the cholesteric liquid crystal device is irradiated by a light.

12. The cholesteric liquid crystal writing board according to claim 1, wherein the mode switch is switched to the voltage output mode within a frame time, and is switched to the voltage write mode within another frame time.

13. The cholesteric liquid crystal writing board according to claim 1, wherein a control end of the switch element connects to one of the gate control lines, a first end of the switch element connects to one of the mode control lines, a second end of the switch element connects to one end of the light-sensing element, and the other end of the light-sensing element connects to a reference voltage.

14. The cholesteric liquid crystal writing board according to claim 1, wherein the cholesteric liquid crystal device further comprises a first substrate and a second substrate opposite to the first substrate, the cholesteric liquid crystal layer is disposed between the first substrate and the second substrate, the cholesteric liquid crystal device further comprises a first transparent electroconductive layer disposed on a surface of the first substrate facing toward the cholesteric liquid crystal layer, and the cholesteric liquid crystal device further comprises a second transparent electroconductive layer disposed on one side of the second substrate facing toward the cholesteric liquid crystal layer.

15. The cholesteric liquid crystal writing board according to claim 14, wherein the first transparent electroconductive layer comprises a plurality of first electrodes extending in a first direction and separately disposed, the second transparent electroconductive layer comprises a plurality of second electrodes extending in a second direction and separately disposed, and the first direction is different from the second direction.

16. The cholesteric liquid crystal writing board according to claim 15, wherein the cholesteric liquid crystal device further comprises a plurality of liquid crystal control areas, and when viewing from a top of the light-entering surface, the first electrodes are crossed with the second electrodes and their intersections are disposed in correspondence to the liquid crystal control areas.

17. The cholesteric liquid crystal writing board according to claim 14, wherein the cholesteric liquid crystal device further comprises a plurality of liquid crystal control areas, the second transparent electroconductive layer comprises a plurality of electrode blocks, and the electrode blocks are disposed in correspondence with the liquid crystal control areas.

18. The cholesteric liquid crystal writing board according to claim 14, wherein the cholesteric liquid crystal device further comprises a plurality of liquid crystal control areas, the first transparent electroconductive layer and the second transparent electroconductive layer comprise a plurality of electrode blocks, and the electrode blocks are disposed in correspondence with the liquid crystal control areas.

19. The cholesteric liquid crystal writing board according to claim 14, wherein the cholesteric liquid crystal device further comprises an insulating layer, and the second transparent electroconductive layer, the insulating layer and the photo-sensing array layer are sequentially stacked on a surface of the second substrate facing toward the cholesteric liquid crystal layer.

20. The cholesteric liquid crystal writing board according to claim 14, wherein the photo-sensing array layer is disposed on a surface of the second substrate away from the cholesteric liquid crystal layer.

21. The cholesteric liquid crystal writing board according to claim 14, wherein the photo-sensing array layer is disposed on a side of the second substrate away from the cholesteric liquid crystal layer, the photo-sensing array layer comprises a third substrate, and the light-sensing elements arranged in an array are disposed on a surface of the third substrate facing toward the second substrate.

* * * * *